United States Patent
Miyata

(10) Patent No.: US 11,128,807 B2
(45) Date of Patent: Sep. 21, 2021

(54) STOP CONTROL DEVICE, STOP CONTROL METHOD, STOP CONTROL PROGRAM, EXPOSURE CONTROL DEVICE, EXPOSURE CONTROL METHOD, EXPOSURE CONTROL PROGRAM, INTERCHANGEABLE LENS, CAMERA MAIN BODY, AND CAMERA

(71) Applicant: FUJIFILM Corporation, Tokyo (JP)

(72) Inventor: Masahiko Miyata, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/991,783

(22) Filed: Aug. 12, 2020

(65) Prior Publication Data

US 2020/0374445 A1     Nov. 26, 2020

Related U.S. Application Data

(63) Continuation of application No. PCT/JP2019/002940, filed on Jan. 29, 2019.

(30) Foreign Application Priority Data

Feb. 20, 2018   (JP) ................. JP2018-028003

(51) Int. Cl.
    *H04N 5/235*      (2006.01)
    *G03B 9/06*       (2021.01)
    (Continued)

(52) U.S. Cl.
    CPC ............ *H04N 5/2353* (2013.01); *G03B 9/06* (2013.01); *G03B 17/14* (2013.01); *H04N 5/238* (2013.01)

(58) Field of Classification Search
    CPC ........ G03B 17/14; G03B 17/20; G03B 13/36; G03B 7/087; G03B 7/095; G03B 7/097;
    (Continued)

(56) References Cited

U.S. PATENT DOCUMENTS

| | | | | |
|---|---|---|---|---|
| 6,089,760 A | * | 7/2000 | Terada | .............. G03B 9/22 396/463 |
| 2008/0165431 A1 | * | 7/2008 | Kokabu | ............ G02B 7/102 359/697 |

(Continued)

FOREIGN PATENT DOCUMENTS

| | | |
|---|---|---|
| CN | 101819369 A | 9/2010 |
| CN | 102164247 A | 8/2011 |

(Continued)

OTHER PUBLICATIONS

International Preliminary Report on Patentability and English translation, with a completion date of Feb. 27, 2020, and Written Opinion of the International Searching Authority (forms PCT/IPEA/409 and PCT/ISA/237), for corresponding International Application No. PCT/JP2019/002940.

(Continued)

*Primary Examiner* — Chiawei Chen
(74) *Attorney, Agent, or Firm* — Birch, Stewart, Kolasch & Birch, LLP

(57) ABSTRACT

Provided are a stop control device, a stop control method, a stop control program, an exposure control device, an exposure control method, an exposure control program, an interchangeable lens, a camera main body, and a camera capable of setting accurately a target opening diameter in a short time. In a case where a stop is set to the target opening diameter, a driving stop position of a stop motor at which an opening diameter reaches the target opening diameter in a case where the stop motor is driven at a first speed is A, and a variation width of the opening diameter caused in a case where the opening diameter reaches the target opening diameter by driving the stop motor (36) at a second speed faster than the first speed is X. The driving stop position of the stop motor is A, and the stop motor is driven at a first speed in a section from the start of driving to a position P is (Continued)

driven at the second speed, and the stop motor is driven at the first speed in a section after the position P. The position P is set to a position of (A−X/2).

24 Claims, 19 Drawing Sheets

(51) Int. Cl.
*G03B 17/14* (2021.01)
*H04N 5/238* (2006.01)

(58) Field of Classification Search
CPC ... G03B 9/00; G03B 9/02; G03B 9/07; G03B 9/06; H04N 5/232411; H04N 5/23245; H04N 5/2351; H04N 5/2353; H04N 5/238; H04N 2101/00; H04N 5/2171; H04N 5/2254; H04N 5/23209; H04N 5/232122; H04N 5/232123; H04N 5/232935; H04N 5/232939; H04N 5/232941; H04N 5/232945; H04N 5/2251; H04N 5/232; G02B 7/102
See application file for complete search history.

(56) References Cited

U.S. PATENT DOCUMENTS

2014/0079380 A1\* 3/2014 Taguchi ............. H04N 5/23209
396/63

2015/0062414 A1\* 3/2015 Hirasawa ............... H04N 5/238
348/363
2016/0037040 A1\* 2/2016 Asano ................ H04N 5/23212
348/364

FOREIGN PATENT DOCUMENTS

| CN | 106027914 A | 10/2016 |
|----|---|---|
| CN | 106254761 A | 12/2016 |
| CN | 107431764 A | 12/2017 |
| JP | 2005-242114 A | 9/2005 |
| JP | 2006-243372 A | 9/2006 |
| JP | 2012-2985 A | 1/2012 |
| JP | 2012-13896 A | 1/2012 |
| JP | 4933049 B2 | 5/2012 |
| JP | 2014-21149 A | 2/2014 |

OTHER PUBLICATIONS

International Search Report (form PCT/ISA/210), dated May 7, 2019, for corresponding International Application No. PCT/JP2019/002940, with an English translation.

Chinese Office Action and Search Report dated Jun. 21, 2021 for Application No. 201980014463.4, with an English Translation.

\* cited by examiner

STOP CONTROL DEVICE, STOP CONTROL METHOD, STOP CONTROL PROGRAM, EXPOSURE CONTROL DEVICE, EXPOSURE CONTROL METHOD, EXPOSURE CONTROL PROGRAM, INTERCHANGEABLE LENS, CAMERA MAIN BODY, AND CAMERA

CROSS-REFERENCE TO RELATED APPLICATIONS

The present application is a Continuation of PCT International Application No. PCT/JP2019/002940 filed on Jan. 29, 2019 claiming priority under 35 U.S.C. § 119(a) to Japanese Patent Application No. 2018-028003 filed on Feb. 20, 2018. Each of the above applications is hereby expressly incorporated by reference, in its entirety, into the present application.

BACKGROUND OF THE INVENTION

1. Field of the Invention

The present invention relates to a stop control device, a stop control method, a stop control program, an exposure control device, an exposure control method, an exposure control program, an interchangeable lens, a camera main body, and a camera of a stop of which an opening diameter changes by driving an actuator.

2. Description of the Related Art

In general, an iris stop is used as a stop of a camera lens. It is known that there is a difference in an actual opening diameter (F number) of the iris stop depending on a driving speed of an actuator.

JP2012-013896A proposes that the amount of driving is corrected according to the driving speed of the actuator in order to prevent the difference in the actual opening diameter from being generated depending on the driving speed of the actuator. JP2012-013896A also proposes that the amount of driving is corrected according to a deceleration rate of the actuator in a case where a speed reduction of the actuator is controlled.

SUMMARY OF THE INVENTION

Incidentally, there is a disadvantage that variation is caused in the actually obtained opening diameter even though the iris stop is driven under the same condition. This variation can be suppressed by driving the iris stop at a low speed. However, in a case where the iris stop is driven at a low speed, there is a disadvantage that a time required to complete an operation of the stop is long. The variation can also be suppressed by controlling, the speed reduction of the actuator as in JP2012-013896A. However, in a case where the speed of the actuator is uniformly reduced as in JP2012-013896A, there is a disadvantage that the variation cannot be appropriately suppressed.

The present invention has been made in view of such circumstances, and an object of the present invention is to prove a stop control device, a stop control method, a stop control program, an exposure control device, an exposure control method, an exposure control program, an interchangeable lens, a camera main body, and a camera capable of accurately setting a target opening diameter in a short time.

Means for solving the aforementioned problems are as follows.

(1) There is provided a stop control device comprising a driving condition setting unit (at least one processor) that sets a driving condition of an actuator of a stop required to cause an opening diameter to reach a set target opening diameter, a driving controller (at least one processor) that drives the actuator under the set driving condition. Assuming that a driving stop position of the actuator at which the opening diameter readies the target opening diameter in a case where the actuator is driven at a first speed is A and a variation width of the opening diameter caused in a case where the opening diameter reaches the target opening diameter by driving the actuator at a second speed faster than the first speed is X, the driving condition setting unit performs the setting such that the driving stop position of the actuator is A, the actuator is driven at the first speed in a low-speed driving section which is a section after at least (A−X/2) and the actuator is driven at the second speed in a section before the low-speed driving section.

According to the present aspect, the actuator is driven at a low speed (first speed) for a predetermined section before the driving is stopped. The driving stop position of the actuator is A. This position A is a driving stop position of the actuator at which the opening diameter reaches the target opening diameter in a case where the actuator is driven at a low speed (first speed). A section in which the actuator is driven at a low speed (first speed) is a low-speed driving section. At least a section after (A−X/2) is secured as the low-speed driving section. X is a variation width of the opening diameter caused in a case where the opening diameter reaches the target opening diameter by driving the actuator at a high speed (second speed). That is, the speed of the actuator is reduced and is driven at a low speed before at least a half (½) of the variation width X. Accordingly, the variation equal to that in the case of driving at a low speed can be caused, and the target opening diameter can be accurately set. The target opening diameter can be set in a short time by limiting the low-speed driving section to a predetermined section.

(2) In the stop control device according to (1), the driving condition setting unit determines whether or not the variation width of the opening diameter caused in a case where the actuator is driven at the second speed is within an allowable range, and performs the selling such that the actuator is driven at the second speed in a case where the variation width is within the allowable range.

According to the present aspect, the driving condition is switched depending on whether or not the variation width of the opening diameter caused in a case where the actuator is driven at a high speed (second speed) is within the allowable range, in a case where the variation width is within the allowable range, the setting is performed such that the actuator is driven at a high speed (second speed). In other words, the driving control of (1) is performed in a case where the variation width exceeds the allowable range. In a case where the variation width is within the allowable range even though the actuator is driven at a high speed (second speed), the setting is performed such that the actuator is driven at a high speed (second speed) without providing the low-speed driving section. Meanwhile, in a case where the actuator is driven at a high speed (second speed) and the variation width exceeds the allowable range, the variation is suppressed by performing the driving control of (1). Thus, the driving of the actuator of the stop can be appropriately controlled according to the required accuracy of the opening diameter.

(3) The stop control device according to (2) further comprises an operation speed setting unit (at least one processor) that sets an operation speed of the stop. In a case where the set operation speed of the stop is a low speed, the driving condition setting unit performs the setting such that the actuator is driven at the first speed.

According to the present aspect, the operation speed of the stop can be set, and the setting is performed such that the actuator is constantly driven at a low speed (first speed) in a case where the set operation speed of the stop is the low speed.

(4) In the stop control device according to (3), in a case where an amount of change in the opening diameter is equal to or less than a first threshold value, the operation speed setting unit performs the setting such that the stop is operated at the low speed.

According to the present aspect, in a case where the amount of change in the opening diameter is equal to or less than the first threshold value, the setting is performed such that the stop is operated at a low speed. In a case where the amount of change in the opening diameter is small, since the amount of driving of the actuator is also small, even though the actuator is driven at a high speed, an effect of reducing a driving time is small. Accordingly, in such a case, the setting is performed such that the stop is operated at a low speed.

(5) The stop control device according to any one of (1) to (4) further comprises a driving speed setting unit (at least one processor) that sets the first speed and the second speed.

According to the present aspect, the first speed and the second speed can be set. In this case, the second speed is a speed faster than the first speed. That is, the first speed does not exceed the second speed.

(6) There is provided an interchangeable lens comprising the stop control device according to any one of (1) to (5).

According to the present aspect, the stop control device according to any one of (1) to (5) is provided in the interchangeable lens of the interchangeable lens camera.

(7) There is provided a camera main body comprising the interchangeable lens according to (6) attached thereto.

According to the present aspect, in the interchangeable lens camera, the interchangeable lens of (6) is attached to the camera main body. That is, the interchangeable lens comprising any one of the stop control device according to any one of (1) to (5) is attached to the camera main body.

(8) The camera main body according to (7) further comprises an exposure start condition setting unit (at least one processor) that sets an exposure start condition, and an exposure controller (at least one processor) that starts an exposure under the set start condition after driving of the actuator is stopped. In a case where a speed of the actuator before the driving of the actuator is stopped is equal to or greater than a second threshold value, the exposure start condition setting unit sets a waiting time between stoppage of the driving of the actuator and start of the exposure.

According to the present aspect, in a case where the speed of the actuator that drives the stop before the driving is stopped is equal to or greater than the second threshold value, the waiting time is set between the stoppage of the driving of the actuator and the start of the exposure. In a case where the speed of the actuator that drives the stop before the driving is stopped is the high speed, a predetermined time is required until the stop leaf blade completely stops. Thus, in a case where the speed of the actuator before the driving is stopped is the high speed, the setting is performed such that a fixed waiting time is set after the driving is stopped and the exposure is started after the waiting time elapses. Accordingly, it is possible to perform imaging with accurate exposure. In a case where the speed before the driving is stopped is less than the second threshold value, the exposure is started with no waiting time. In this case, since the stop leaf blade stops in a short time, the exposure is started with no waiting time.

(9) In the camera main body according to (8), in a case where the speed of the actuator before the driving of the actuator is stopped is equal to or greater than the second threshold value and a maximum amount of change in the opening diameter of the stop after the driving of the actuator is stopped is equal to or greater than a third threshold value, the exposure start condition setting unit sets the waiting time between the stoppage of the driving of the actuator and the start of the exposure.

According to the present aspect, in a case where the speed of the actuator before the driving is stopped is equal to or greater than the second threshold value and the maximum amount of change in the opening diameter of the stop after the driving of the actuator is stopped is equal to or greater than the third threshold value, the waiting time is set between the stoppage of the driving of the actuator and the start of the exposure. Even though the speed of the actuator before the driving is stopped is the high speed, in a case where the amount of change in the opening diameter of the stop is small, the influence on the exposure is small. Thus, in the present aspect, the waiting time is set only in a case where the speed of the actuator before the driving is stopped is the high speed and the amount of change in the opening diameter of the stop after the driving is stopped is large. Accordingly, the time can be set appropriately according to the situation. The amount of change in the opening diameter is maximum immediately after the driving of the actuator is stopped, and is converged in a sequence of time. Thus, the amount of change mentioned herein is the change immediately after the driving is stopped, that is, the maximum change (maximum amount of change). The maximum amount of change is correlated with the variation.

(10) In the camera main body according to (8), in a case where the speed of the actuator before the driving of the actuator is stopped is equal to or greater than the second threshold value and an exposure time is equal to or less than a fourth threshold value, the exposure start condition setting unit sets the waiting time between the stoppage of the driving of the actuator and the start of the exposure.

According to the present aspect, in a case where the speed of the actuator before the driving is stopped is equal to or greater than the second threshold value and the exposure time is equal to or less than the fourth threshold value, the waiting time is set between the stoppage of the driving of the actuator and the start of the exposure. In a case where the exposure time is long, even though the exposure is started before the stop leaf blade completely stops, the influence on the exposure is small. Thus, in the present aspect, the waiting time is set only in a case where the speed of the actuator before the driving is stopped is the high speed and the exposure time is short. Accordingly, the time can be set appropriately according to the situation.

(11) In the camera main body according to (8), in a case where the speed of the actuator before the driving of the actuator is stopped is equal to or greater than the second threshold value, a maximum amount of change in the opening diameter of the stop after the driving of the actuator is stopped is equal to or greater than a third threshold value, and an exposure time is equal to or less than a fourth threshold value, the exposure start condition setting unit sets the waiting time between the stoppage of the driving of the actuator and the start of the exposure.

According to the aspect, the speed of the actuator before the driving is stopped is equal to or greater than the second threshold value, the maximum amount of change in the opening diameter of the stop after the driving of the actuator is stopped is equal to or greater than the third threshold value, and the exposure time is equal to or less than the fourth threshold value, the waiting time is set between the stoppage of the driving of the actuator and the start of the exposure. Accordingly, the time can be set appropriately according to the situation.

(12) in the camera main body according to (10) or (11), a half of a period of the change in the opening diameter of the stop after the driving of the actuator is stopped is used as the fourth threshold value.

According to the present aspect, the half of the period of the change in the opening diameter of the stop after the driving of the actuator is stopped is used as the fourth threshold value. That is, it is determined whether or not it is necessary to set the waiting time based on whether or not the exposure time is equal to or less than the half of the period of the change in the opening diameter. Thus, it is possible to appropriately determine whether or not it is necessary to set the waiting time.

(13) In the camera main body according to any one of (8) to (12), a time from when the driving of the actuator is stopped to when the change in the opening diameter of the stop is converged to a predetermined value or less is used as the waiting time.

According to the present aspect, the time from when the driving of the actuator is stopped to when the change in the opening diameter of the stop is converged to the predetermined value or less is used as the waiting time. Accordingly, the waiting time can be appropriately set.

(14) There is provided a camera comprising the stop control device according to any one of (1) to (5).

According to the present aspect, the stop control device according to any one of (1) to (5) is provided in the camera.

(15) The camera according to (14) further comprises an exposure start condition setting unit (at least one processor) that sets an exposure start condition and an exposure controller that starts an exposure under the set start condition after driving of the actuator is stopped. In a case where a speed of the actuator before the driving of the actuator is stopped is equal to or greater than a second threshold value, the exposure start condition setting unit sets a waiting time between stoppage of the driving of the actuator and start of the exposure.

According to the present aspect, in a case where the speed of the actuator that drives the stop before the driving is stopped is equal to or greater than the second threshold value, the waiting time is set between the stoppage of the driving of the actuator and the start of the exposure. In a case where the speed of the actuator that drives the stop before the driving is stopped is the high speed, a predetermined time is required until the stop leaf blade completely stops. Thus, in a case where the speed of the actuator before the driving is stopped is the high speed, the setting is performed such that a fixed waiting time is set after the driving is stopped and the exposure is started after the waiting time elapses. Accordingly, it is possible to perform imaging with accurate exposure. In a case where the speed before the driving is stopped is less than the second threshold value, the exposure is started with no waiting time. In this case, since the stop leaf blade stops in a short time, the exposure is started with no waiting time.

(16) In the camera according to (15), in a case where the speed of the actuator before the driving of the actuator is stopped is equal to or greater than the second threshold value and a maximum amount of change in the opening diameter of the stop after the driving of the actuator is stopped is equal to or greater than a third threshold value, the exposure start condition setting unit sets the waiting time between the stoppage of the driving of the actuator and the start of the exposure.

According to the present aspect, in a case where the speed of the actuator before the driving is stopped is equal to or greater than the second threshold value and the maximum amount of change in the opening diameter of the stop after the driving of the actuator is stopped is equal to or greater than the third threshold value, the waiting time is set between the stoppage of the driving of the actuator and the start of the exposure. Even though the speed of the actuator before the driving is stopped is the high speed, in a case where the amount of change in the opening diameter of the stop is small, the stop leaf blade stops in a short time after the driving of the actuator is stopped. Thus, in the present aspect, the waiting time is set only in a case where the speed of the actuator before the driving is stopped is the high speed and the amount of change in the opening diameter of the stop after the driving is stopped is large. Accordingly, the time can be set appropriately according to the situation.

(17) In the camera according to (15), in a case where the speed of the actuator before the driving of the actuator is stopped is equal to or greater than the second threshold value and an exposure time is equal to or less than a fourth threshold value, the exposure start condition setting unit sets the waiting time between the stoppage of the driving of the actuator and the start of the exposure.

According to the present aspect, in a case where the speed of the actuator before the driving is stopped is equal to or greater than the second threshold value and the exposure time is equal to or less than the fourth threshold value, the waiting time is set between the stoppage of the driving of the actuator and the start of the exposure. In a case where the exposure time is long, even though the exposure is started before the stop leaf blade completely stops, the influence on the exposure is small. Thus, in the present aspect, the waiting time is set only in a case where the speed of the actuator before the driving is stopped is the high speed and the exposure time is short. Accordingly, the time can be set appropriately according to the situation.

(18) In the camera according to (15), in a case where the speed of the actuator before the driving of the actuator is stopped is equal to or greater than the second threshold value, a maximum amount of change in the opening diameter of the stop after the driving of the actuator is stopped is equal to or greater than a third threshold value, and an exposure time is equal to or less than a fourth threshold value, the exposure start condition setting unit sets the waiting time between the stoppage of the driving of the actuator and the start of the exposure.

According to the aspect, the speed of the actuator before the driving is stopped is equal to or greater than the second threshold value, the maximum amount of change in the opening diameter of the stop after the driving of the actuator is stopped is equal to or greater than the third threshold value, and the exposure time is equal to or less than the fourth threshold value, the waiting time is set between the stoppage of the driving of the actuator and the start of the exposure. Accordingly, the time can be set appropriately according to the situation.

(19) The camera according to (17) or (18), a half of a period of the change in the opening diameter of the stop after the driving of the actuator is stopped is used as the fourth threshold value.

According to the present aspect, the half of the period of the change in the opening diameter of the stop after the driving of the actuator is stopped is used as the fourth threshold value. That is, it is determined whether or not it is necessary to set the waiting time based on whether or not the exposure time is equal to or less than the half of the period of the change in the opening diameter. Thus, it is possible to appropriately determine whether or not it is necessary to set the waiting time.

(20) In the camera according to any one of (15) to (19), a time from when the driving of the actuator is stopped to when the change in the opening diameter of the stop is converged to a predetermined value or less is used as the waiting time.

According to the present aspect, the time from when the driving of the actuator is stopped to when the change in the opening diameter of the stop is converged to the predetermined value or less is used as the waiting time. Accordingly, the waiting time can be appropriately set.

(21) There is provided an exposure control device comprising a driving condition setting unit (at least one processor) that sets a driving condition of an actuator of a stop required to cause an opening diameter to reach a set target opening diameter, a driving controller that drives the actuator under the set driving condition, an exposure start condition setting unit (at least one processor) that sets an exposure start condition, and an exposure controller that starts an exposure under the set start condition after driving of the actuator is stopped. In a case where a speed of the actuator before the driving of the actuator is stopped is equal to or greater than a fifth threshold value, the exposure start condition setting unit sets a waiting time between stoppage of the driving of the actuator and start of the exposure.

According to the present aspect, the driving condition setting unit sets the driving condition of the actuator of the stop. In a case where the set speed of the actuator before the driving is stopped is equal to or greater than the fifth threshold value, the waiting time is set between the stoppage of the driving of the actuator and the start of the exposure. In a case where the speed of the actuator that drives the stop before the driving is stopped is the high speed, a predetermined time is required until the stop leaf blade completely stops. Thus, in a case where the speed of the actuator before the driving is stopped is the high speed, the setting is performed such that a fixed waiting time is set after the driving is stopped and the exposure is started after the waiting time elapses. Accordingly, it is possible to perform imaging with accurate exposure. In a case where the speed before the driving is stopped is less than the fifth threshold value, the exposure is started with no waiting time. In this case, since the stop leaf blade stops in a short time, the exposure is started with no waiting time.

(22) In the exposure control device according to (21), in a case where the speed of the actuator before the driving of the actuator is stopped is equal to or greater than the fifth threshold value and a maximum amount of change in the opening diameter of the stop after the driving of the actuator is stopped is equal to or greater than a sixth threshold value, the exposure start condition setting unit sets the waiting time between the stoppage of the driving of the actuator and the start of the exposure.

According to the present aspect, in a case where the set speed of the actuator before the driving is stopped is equal to or greater than the fifth threshold value and the maximum amount of change in the opening diameter of the stop after the driving of the actuator is stopped is equal to or greater than the sixth threshold value, the waiting time is set between the stoppage of the driving of the actuator stops and the start of the exposure. Even though the speed of the actuator before the driving is stopped is the high speed, in a case where the amount of change in the opening diameter of the stop is small, the influence on the exposure is small. Thus, in the present aspect, the waiting time is set only in a case where the speed of the actuator before the driving is stopped is the high speed and the maximum amount of change in the opening diameter of the stop after the driving is stopped is large. Accordingly, the time can be set appropriately according to the situation.

(23) In the exposure control device according to (21), in a case where the speed of the actuator before the driving of the actuator is stopped is equal to or greater than the fifth threshold value and an exposure time is equal to or less than a seventh threshold value, the exposure start condition setting unit sets the waiting time between the stoppage of the driving of the actuator and the start of the exposure.

According to the present aspect, in a case Where the set speed of the actuator before the driving is stopped is equal to or greater than the fifth threshold value and the exposure time is equal to or less than the seventh threshold value, the waiting time is set between the stoppage of the driving of the actuator and the start of exposure. In a case where the exposure time is long, even though the exposure is started before the stop leaf blade completely stops, the influence on the exposure is small. Thus, in the present aspect, the waiting time is set only in a case where the speed of the actuator before the driving is stopped is the high speed and the exposure time is short. Accordingly, the time can be set appropriately according to the situation.

(24) In the exposure control device according to (21), in a case where the speed of the actuator before the driving of the actuator is stopped is equal to or greater than the fifth threshold value, a maximum amount of change in the opening diameter of the stop after the driving of the actuator is stopped is equal to or greater than a sixth threshold value, and an exposure time is equal to or less than a seventh threshold value, the exposure start condition setting unit sets the waiting time between the stoppage of the driving of the actuator and the start of the exposure.

According to the present aspect, the set speed of the actuator before the driving of the actuator is stopped is equal to or greater than the fifth threshold value, the maximum amount of change in the opening diameter of the stop after the driving of the actuator is stopped is equal to or greater than the sixth threshold value, and the exposure time is equal to or less than the seventh threshold value, the waiting time is set between the stoppage of the driving of the actuator and the start of the exposure. Accordingly, the time can be set appropriately according to the situation.

(25) in the exposure control device according to (23) or (24), a half of a period of the change in the opening diameter of the stop after the driving of the actuator is stopped is used as the seventh threshold value.

According to the present aspect, the half of the period of the change in the opening diameter of the stop after the driving of the actuator is stopped is used as the seventh threshold value. That is, it is determined whether or not it is necessary to set the waiting time based on whether or not the exposure time is equal to or less than the half of the period of the change in the opening diameter. Thus, it is possible to appropriately determine whether or not it is necessary to set the waiting time.

(26) The exposure control device according to any one of (21) to (25), a time from when the driving of the actuator is stopped to when the change in the opening diameter of the stop is converged to a predetermined value or less is used as the waiting time.

According to the present aspect, the time from when the driving of the actuator is stopped to when the change in the opening diameter of the stop is converged to the predetermined value or less is used as the waiting time. Accordingly, the waiting time can be appropriately set.

(27) There is provided a camera main body comprising the exposure control device according to (21) to (26).

According to the present aspect, the exposure control device according to any one of (21) to (26) is provided in the camera main body of the interchangeable lens camera.

(28) There is provided a camera comprising the exposure control device according to (21) to (26).

According to the present aspect, the exposure control device according to any one of (21) to (26) is provided in the camera.

(29) There is provided a stop control method comprising a step of setting a target opening diameter of a stop, a step of setting a driving condition of an actuator of the stop required to cause an opening diameter to reach the set target opening diameter, in which assuming that a driving stop position of the actuator at which the opening diameter reaches the target opening diameter in a case where the actuator is driven at a first speed is A and a variation width of the opening diameter caused in a case where the opening diameter reaches the target opening diameter by driving the actuator at a second speed faster than the first speed is X, the setting is performed such that the driving stop position of the actuator is set to A, the actuator is driven at the first speed in a low-speed driving section which is a section after at least (A−X/2) and the actuator is driven at the second speed in a section before the low-speed driving section, and a step of operating the stop by driving the actuator under the set driving condition.

According to the present aspect, the actuator is driven at a low speed (first speed) for a predetermined section before the driving is stopped. The driving stop position of the actuator is A. This position A is a driving stop position of the actuator at which the opening diameter reaches the target opening diameter in a case where the actuator is driven at a low speed (first speed). A section in which the actuator is driven at a low speed (first speed) is a low-speed driving section. At least a section after (A−X/2) is secured as the low-speed driving section. X is a variation width of the opening diameter caused in a case where the opening diameter reaches the target opening diameter by driving the actuator at a high speed (second speed). That is, the speed of the actuator is reduced and is driven at a low speed before at least a half (½) of the variation width X. Accordingly, the variation equal to that in the case of driving at a low speed can be caused, and the target opening diameter can be accurately set. The target opening diameter can be set in a short time by limiting the low-speed driving section to a predetermined section.

(30) There is provided a stop control program causing a computer to realize a function of setting a target opening diameter of a stop, a function of setting a driving condition of an actuator of the stop required to cause an opening diameter to reach the set target opening diameter, in which assuming that a driving stop position of the actuator at which the opening diameter reaches the target opening diameter in a case where the actuator is driven at a first speed is A and a variation width of the opening diameter caused in a case where the opening diameter reaches the target opening diameter by driving the actuator at a second speed faster than the first speed is X, the setting is performed such that the driving stop position of the actuator is set to A, the actuator is driven at the first speed in a low-speed driving section as a section after at least (A−X/2) and the actuator is driven at the second speed in a section before the low-speed driving section, and a function of operating the stop by driving the actuator under the set driving condition.

According to the present aspect, the actuator is driven at a low speed (first speed) for a predetermined section before the driving is stopped. The driving stop position of the actuator is A. This position A is a driving stop position of the actuator at which the opening diameter reaches the target opening diameter in a case where the actuator is driven at a low speed (first speed). A section in which the actuator is driven at a low speed (first speed) is a low-speed driving section. At least a section after (A−X/2) is secured as the low-speed driving section. X is a variation width of the opening diameter caused in a case where the opening diameter reaches the target opening diameter by driving the actuator at a high speed (second speed), That is, the speed of the actuator is reduced and is driven at a low speed before at least a half (½) of the variation width X. Accordingly, the variation equal to that in the case of driving at a low speed can be caused, and the target opening diameter can be accurately set. The target opening diameter can be set in a short time by limiting the low-speed driving section to a predetermined section.

(31) There is provided an exposure control method comprising a step of setting a target opening diameter of a stop, a step of setting a driving condition of an actuator of the stop required to cause an opening diameter to reach the set target opening diameter, a step of setting an exposure start condition, in which in a case where a speed of the actuator before driving of the actuator is stopped is equal to or greater than a fifth threshold value, a waiting time is set between stoppage of the driving of the actuator and start of the exposure, a step of operating the stop by driving the actuator under the set driving condition, and a step of starting an exposure under the set start condition after the driving of the actuator is stopped.

According to the present aspect, first, the target opening diameter of the stop is set. Subsequently, the driving condition of the actuator of the stop required to cause the opening diameter to reach the set target opening diameter is set. Subsequently, the exposure start condition is set based on the set driving condition of the actuator of the stop, and the waiting time is set as necessary. That is, it is determined whether or not the set speed of the actuator before the driving is stopped is equal to or greater than the fifth threshold value, and the waiting time is set between the stoppage of the driving of the actuator and the start of the exposure in a case where the speed is equal to or greater than the fifth threshold value. Thereafter, the actuator is driven under the set driving condition, and the stop is set to the target opening diameter. The exposure is started after the driving of the actuator of the stop is stopped. At this time, in a case where the waiting time is set, the exposure starts after the waiting time elapses.

(32) There is provided an exposure control program causing a computer to realize a function of setting a target opening diameter of a stop, a function of setting a driving condition of an actuator of the stop required to cause an opening diameter to reach the set target opening diameter, a function of setting an exposure start condition, in which in a case where a speed of the actuator before driving of the actuator is stopped is equal to or greater than a fifth threshold value, a waiting time is set between stoppage of the driving of the actuator and start of the exposure, a function of operating the stop by driving the actuator under the set driving condition, and a function of starting an exposure under the set start condition after the driving of the actuator is stopped.

According to the present aspect, first, the target opening diameter of the stop is set. Subsequently, the driving condition of the actuator of the stop required to cause the opening diameter to reach the set target opening diameter is set. Subsequently, the exposure start condition is set based on the set driving condition of the actuator of the stop, and the waiting time is set as necessary. That is, it is determined whether or not the set speed of the actuator before the driving is stopped is equal to or greater than the fifth threshold value, and the waiting time is set between the stoppage of the driving of the actuator and the start of the exposure in a case where the speed is equal to or greater than the fifth threshold value. Thereafter, the actuator is driven under the set driving condition, and the stop is set to the target opening diameter. The exposure is started after the driving of the actuator of the stop is stopped. At this time, in a case where the waiting time is set, the exposure starts after the waiting time elapses.

According to the present invention, it is possible to accurately set the target opening diameter in a short time.

DESCRIPTION OF THE PREFERRED EMBODIMENTS

Hereinafter, preferred embodiments for carrying out the present invention will be described in detail with reference to the accompanying drawings.

First Embodiment

Appearance Configuration

Figure 1:
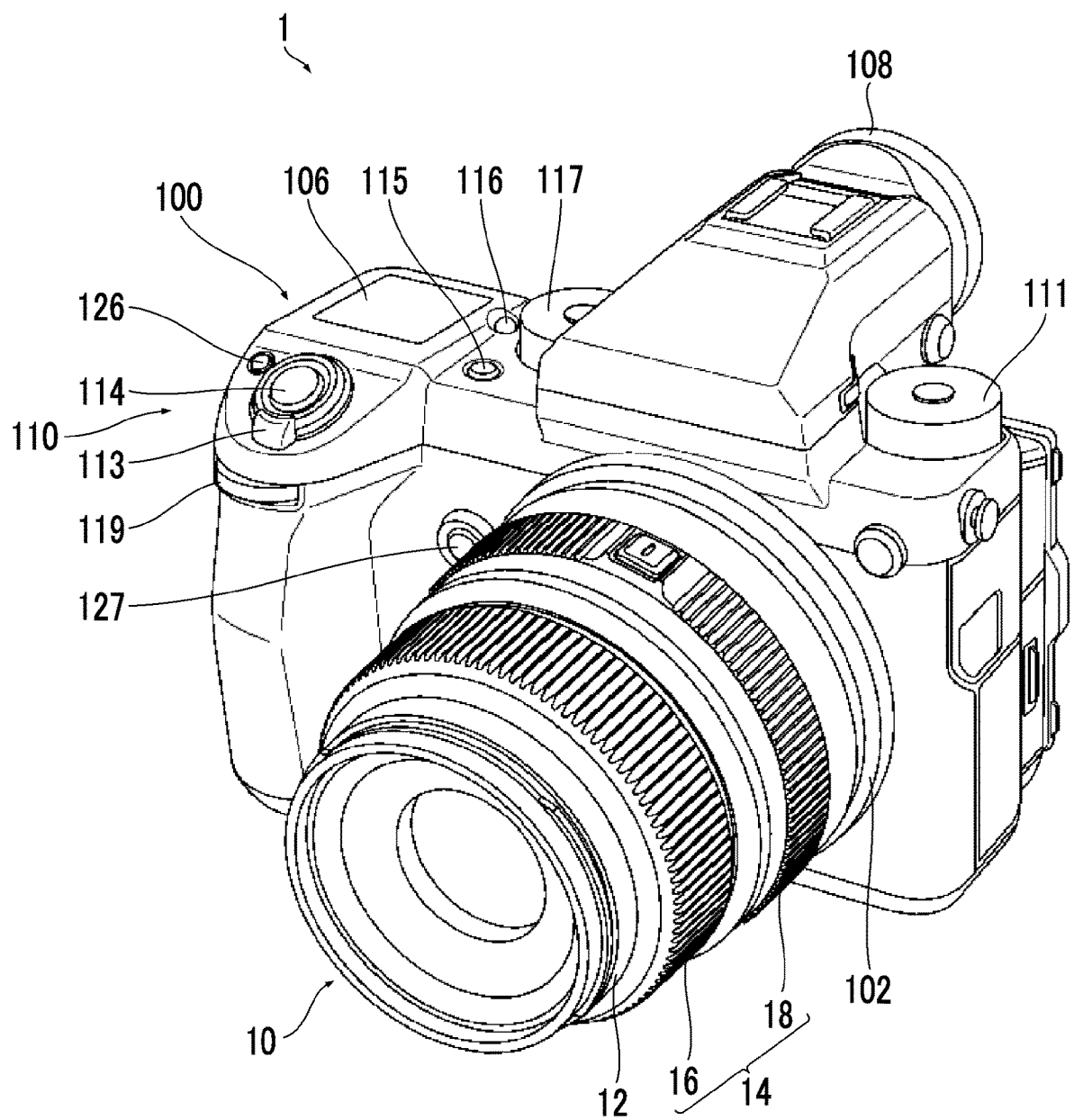
FIG. 1 is a front perspective view showing an embodiment of a camera according to the present invention.
Figure 2:
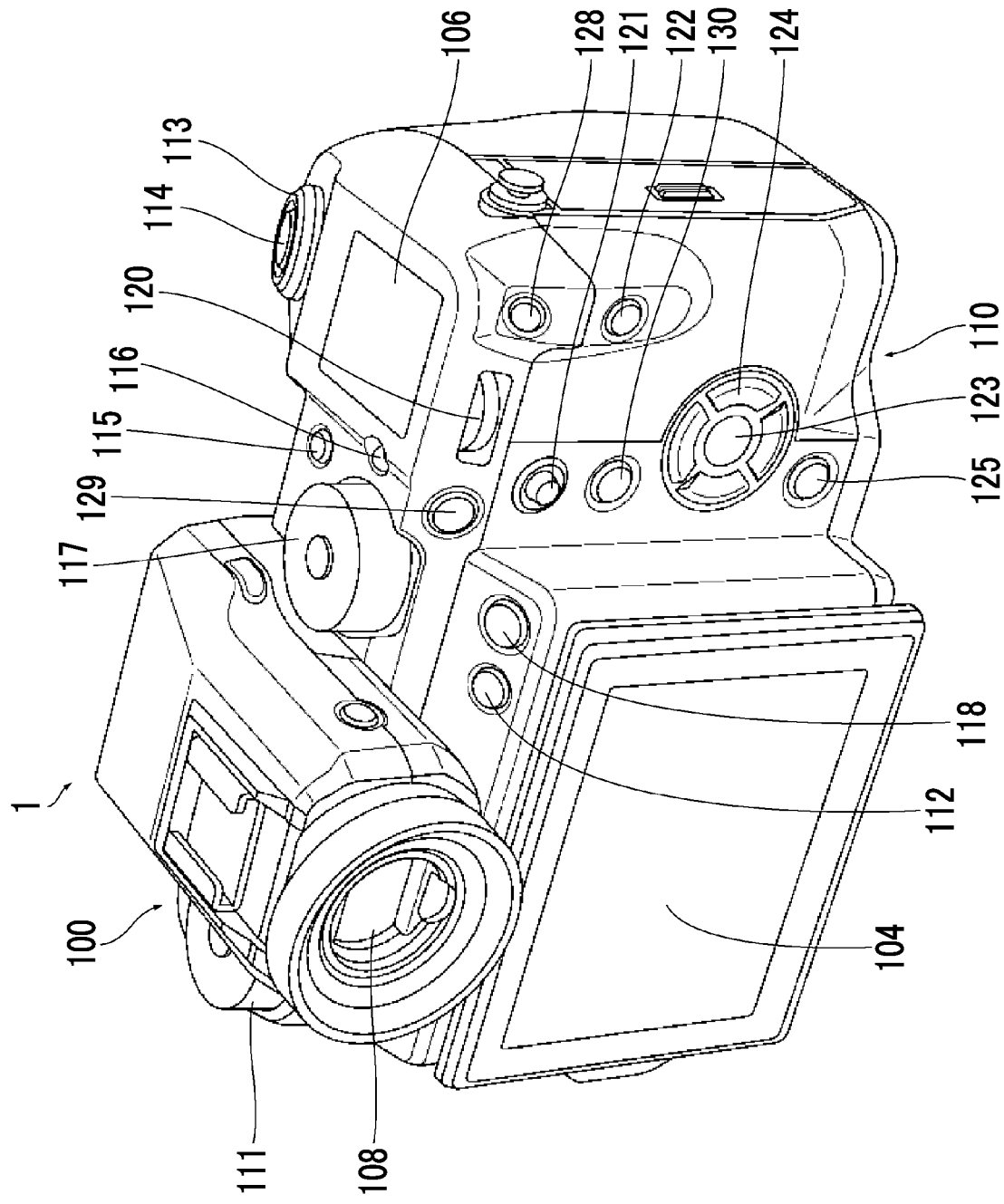
FIG. 2 is a rear perspective view showing an embodiment of the camera according to the present invention.

FIG. 1 is a front perspective view showing an embodiment of a camera according to the present invention. FIG. 2 is a rear perspective view showing the embodiment of the camera according to the present invention.

A camera 1 shown in FIGS. 1 and 2 is an interchangeable lens type digital camera, and comprises an interchangeable lens 10 and a camera main body 100. The interchangeable lens 10 is attachable and detachable to and from the camera main body 100.

Interchangeable Lens

The interchangeable lens 10 can employ various lens configurations such as a single focus lens and a zoom lens. FIGS. 1 and 2 show an example of the single focus lens. The interchangeable lens 10 comprises a lens-side mount (not shown) and a lens operation unit 14.

The lens-side mount is an attachment unit of the interchangeable lens 10 to the camera main body 100, and is provided on a rear end portion of a lens barrel 12. The lens-side mount includes a mount having a structure corresponding to a main-body-side mount 102 provided in the camera main body 100. The lens-side mount has a contact point for electrically connecting the camera main body 100 and the interchangeable lens 10.

The lens operation unit 14 is an operation unit that mainly performs various operations on the interchangeable lens 10. The interchangeable lens 10 according to the present embodiment comprises, as the lens operation unit 14, a focus ring 16 and a stop ring 18.

The focus ring 16 is an operation member for focus adjustment. The focus ring 16 is provided to be rotatable around the lens barrel 12. In a case where the focus ring 16 is rotated, a focus adjustment mechanism is operated according to an operation direction and an operation amount. That is, a focus lens group moves according to the operation direction and the operation amount, and the focus is adjusted.

The stop ring 18 is an operation member for stop setting. The stop ring 18 is provided to be rotatable around the lens barrel 12. F numbers capable of being set on an outer periphery of the stop ring 18 are printed at regular intervals (not shown). The setting of the stop is performed by rotating the stop ring 18 and adjusting the F number desired to be set at a position of an index (not shown) provided on the lens barrel 12.

Camera Main Body

The camera main body 100 comprises the main-body-side mount 102, a main monitor 104, a sub monitor 106, an electronic viewfinder 108, and a camera operation unit 110.

The main-body-side mount 102 is an attachment unit of the camera main body 100 to the interchangeable lens 10, and is provided on a front surface of the camera main body 100. The main-body-side mount 102 includes, for example, a bayonet mount. The main-body-side mount 102 has a contact point for electrically connecting the camera main body 100 and the interchangeable lens 10.

The main monitor 104 is provided on a rear surface of the camera main body 100. The main monitor 104 includes a liquid crystal display (LCD). The main monitor 104 is used as a graphical user interface (GUI) in a case where various settings are performed, and is also used as a monitor for reproducing captured images. In the case of the imaging, a live view is displayed as necessary, and an image captured by an image sensor is displayed in real time.

The sub monitor 106 is provided on an upper surface of the camera main body 100. The sub monitor 106 includes an LCD. The sub monitor 106 displays main imaging information such as shutter speed, an F number, sensitivity, and exposure correction.

The electronic viewfinder (EVF) 108 is provided on an upper portion of the camera main body 100. The live view is displayed on the electronic viewfinder 108, and the image captured by the image sensor in real time is displayed. The electronic viewfinder 108 can be turned on and off as necessary, and can be switched to the display of the main monitor 104.

The camera operation unit 110 is an operation unit that performs various operations on the camera main body 100, and comprises a sensitivity dial 111, a delete button 112, a power lever 113, a shutter button 114, a drive button 115, a sub monitor illumination button 116, a shutter speed dial 117, a playback button 118, a front command dial 119, a rear command dial 120, a focus lever 121, a quick menu button 122, a menu/OK button 123, a selector button 124, a display/BACK button 125, a first function button 126, a second function button 127, a third function button 128, a fourth function button 129, and a fifth function button 130.

The sensitivity dial 111 is a dial for setting sensitivity. The delete button 112 is a button for deleting the captured image. In a case where the button is pushed during the reproduction of the image, the image being reproduced is deleted. The power lever 113 is a lever that turns on and off the power of the camera 1. The shutter button 114 is a button for instructing recording of an image. The shutter button 114 is a two-stroke button capable of being pushed halfway and fully. In a case where the shutter button 114 is pushed halfway, an S1ON signal is output, and in a case where the shutter button is pushed fully, an S2ON signal is output. In a case where a still image is captured, imaging preparation is performed by pushing the shutter button 114 halfway, and image recording is performed by fully pushing the shutter button. In a case where a motion picture is captured, imaging is started by fully pushing the shutter button 114 for the first time, and imaging is ended by fully pushing the shutter button 114 for the second time. The drive button 115 is a button for calling a selection screen of a drive mode. In a case where the drive button 115 is pushed, the selection screen of the drive mode is displayed on the main monitor 104. The drive mode is selected on the selection screen of the drive mode, and single frame imaging, continuous imaging, bracket imaging, multiple exposures, and motion picture imaging are selected. The sub monitor illumination button 116 is a button for turning on and off the illumination of the sub monitor 106. The shutter speed dial 117 is a dial for setting the shutter speed. The playback button 118 is a button for instructing switching to the playback mode. In a case where the camera 1 is activated in an imaging mode and the playback button 118 is pushed, the camera is switched to the playback mode. In a case where the shutter button 114 is pushed in the playback mode, the mode is switched to the imaging mode. Functions corresponding to states of the camera 1 are assigned to the front command dial 119 and the rear command dial 120. The focus lever 121 is a lever that selects an auto focus (AF) area. The quick menu button 122 is a button for calling a quick menu. In a case where the quick menu button 122 is pushed, the quick menu is displayed on the main monitor 104. In the quick menu, items registered by a user among items capable of being set in the camera 1 are displayed. The menu/OK button 123 is a button for calling a menu screen. In a case where the menu/OK button 123 is pushed, the menu screen is displayed on the main monitor 104. The menu/OK button 123 also functions as a button for confirming a selected item. The selector button 124 is a so-called cross button, and is a button capable of instructing in four directions. In a case where various settings are performed, the selector button 124 is used to select an item. The display/BACK button 125 is a button for switching between display contents of the main monitor 104. The display/BACK button 125 also functions as a button for canceling the selected item, that is, a button for returning to the previous state. Functions selected by the user from among functions prepared in advance are assigned to the first function button 126, the second function button 127, the third function button 128, the fourth function button 129, and the fifth function button 130.

Electric Configuration

Figure 3:
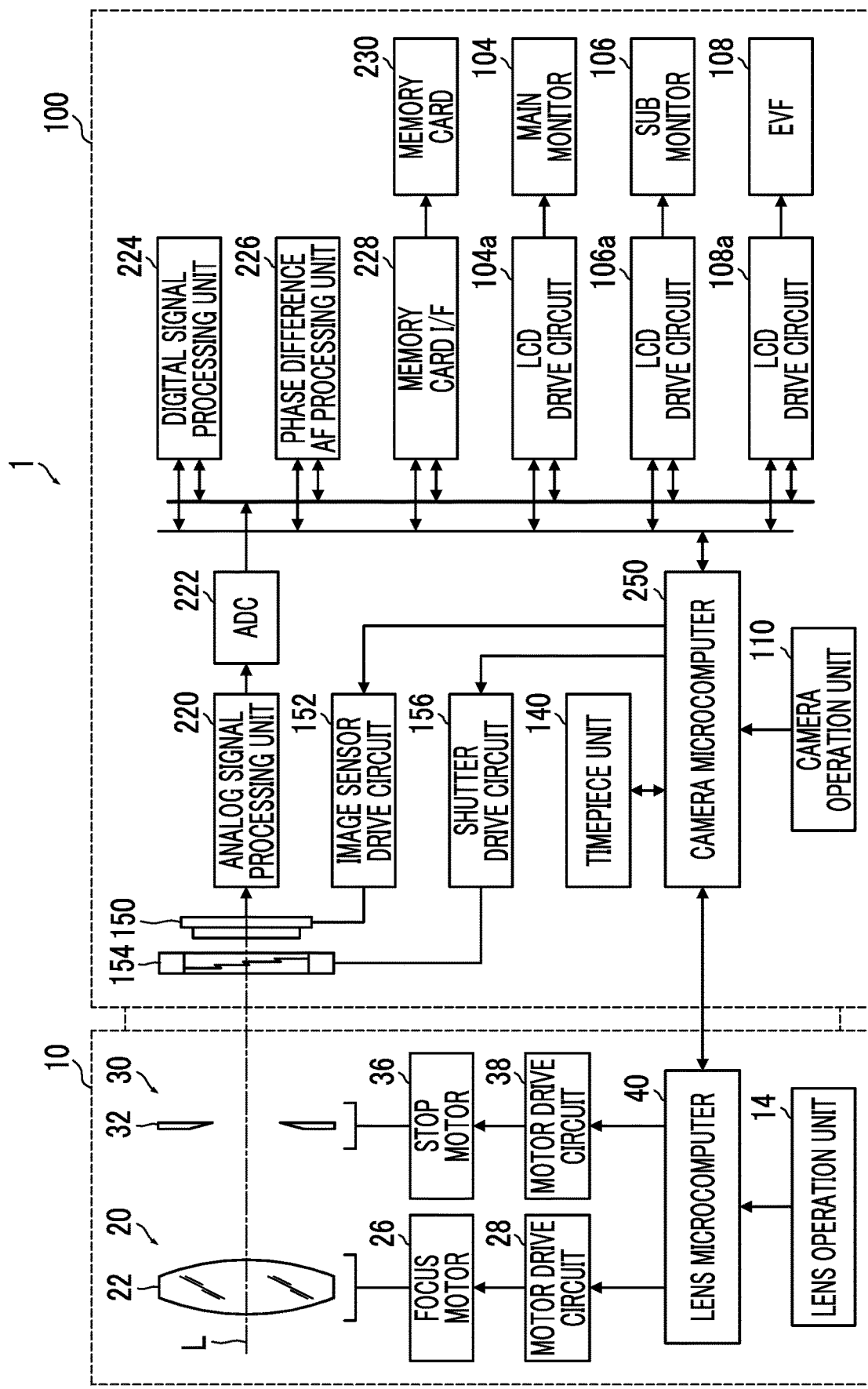
FIG. 3 is a block diagram showing an electric configuration of the camera.

FIG. 3 is a block diagram showing an electric configuration of the camera.

In a case where the interchangeable lens 10 is attached to the camera main body 100, the interchangeable lens 10 and the camera main body 100 are electrically connected to each other by connecting the contact point (not shown) provided at the lens-side mount with the contact point (not shown) provided at the main-body-side mount 102.

Interchangeable Lens

Figure 4:
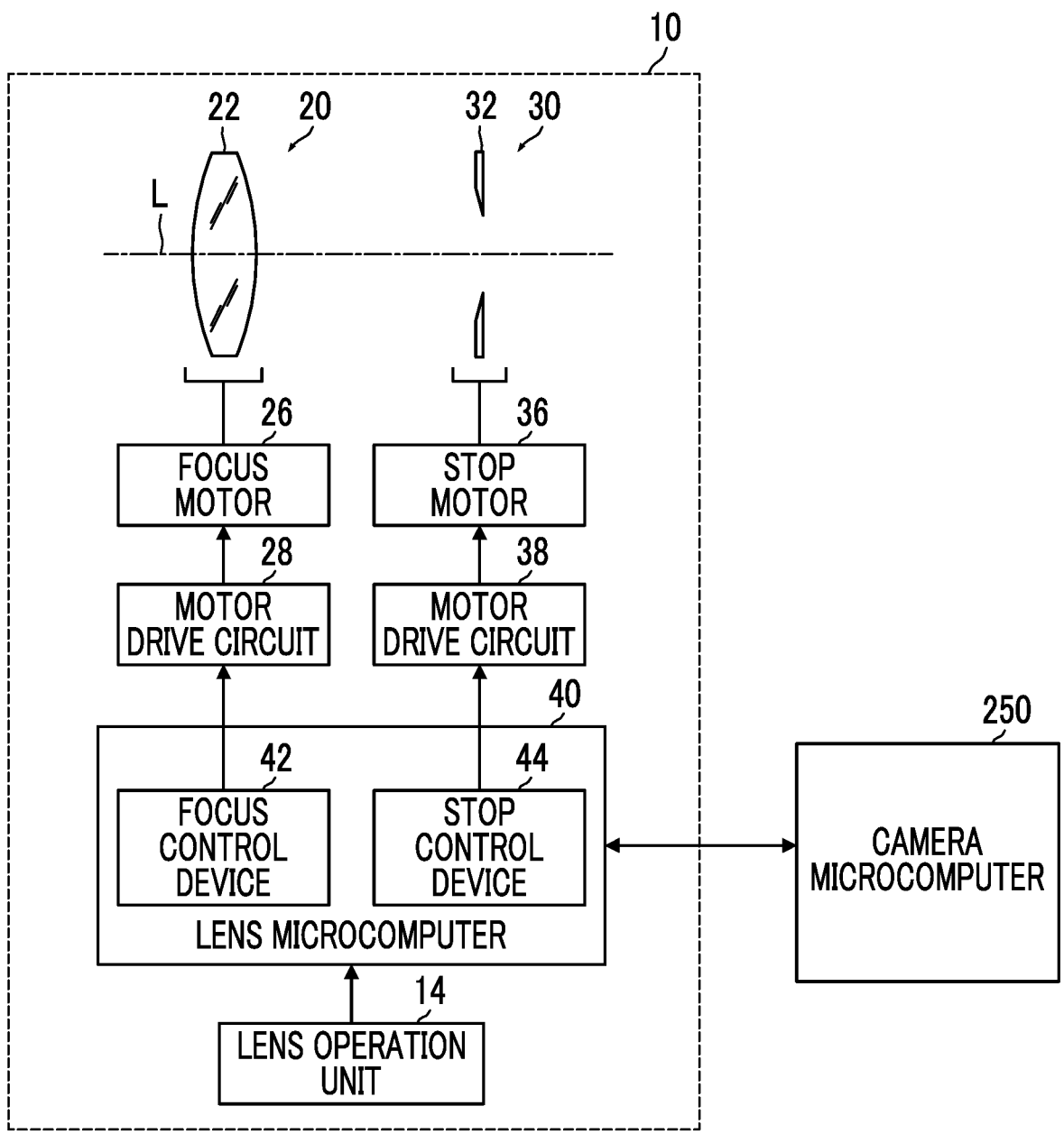
FIG. 4 is a block diagram showing an electric configuration of an interchangeable lens.

FIG. 4 is a block diagram showing an electric configuration of the interchangeable lens.

The interchangeable lens 10 comprises a focus adjustment mechanism 20, a light amount adjustment mechanism 30, and a lens microcomputer 40.

Focus Adjustment Mechanism

The focus adjustment mechanism 20 adjusts the focus by moving a focus lens group 22 back and forth along an optical axis L. The focus lens group 22 is a part of a plurality of lens groups composing the interchangeable lens 10.

The focus adjustment mechanism 20 supports the focus lens group 22 so as to be movable along the optical axis L, and moves the focus lens group 22 along the optical axis L by a focus motor 26. The driving of the focus motor 26 is controlled by the lens microcomputer 40 via a motor drive circuit 28.

Light Amount Adjustment Mechanism

Figure 5:
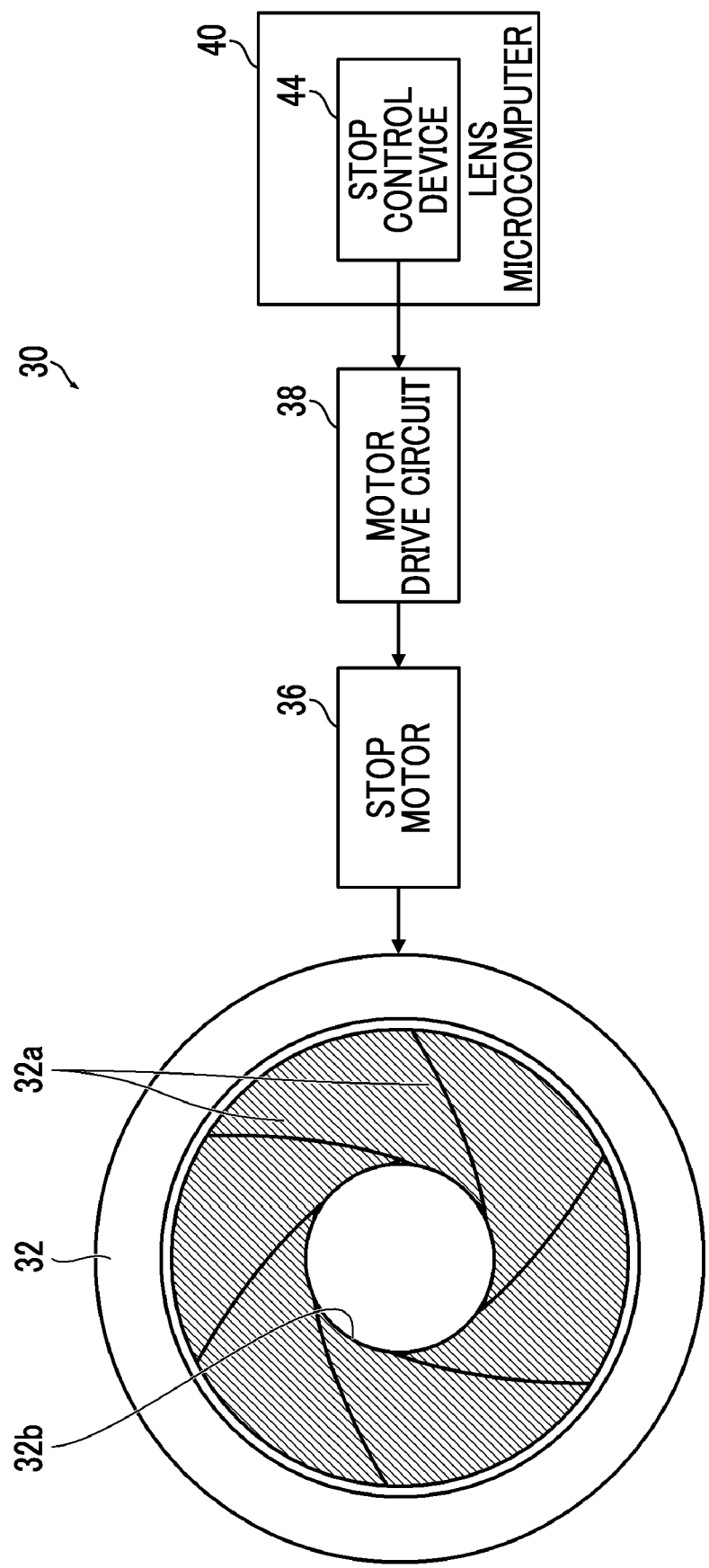
FIG. 5 is a diagram showing a schematic configuration of a light amount adjustment mechanism.

FIG. 5 is a diagram showing a schematic configuration of the light amount adjustment mechanism.

The light amount adjustment mechanism 30 adjusts the amount of light passing through the interchangeable lens 10. The light amount adjustment mechanism 30 includes a stop 32 and a stop motor 36 that drives the stop 32.

The stop 32 is an iris stop. The iris stop is obtained by combining a plurality of stop leaf blades 32*a*, and adjusts the amount of light passing through the interchangeable lens 10 by expanding and contracting a central opening portion 32*b*. Each stop leaf blade 32*a* is simultaneously driven by, for example, a cam mechanism.

The stop motor 36 is an example of an actuator that drives the stop 32. The stop motor 36 is constituted by a stepping motor. The driving of the stop motor 36 is controlled by the lens microcomputer 40 via a motor drive circuit 38.

Lens Microcomputer

The lens microcomputer 40 is a microcomputer comprising a central processing unit (CPU), a read only memory (ROM), and a random access memory (RAM), and functions as a focus control device 42 and a stop control device 44 by executing a predetermined program.

The focus control device 42 controls the movement of the focus lens group 22 by controlling the driving of the focus motor 26. In a case where a focus adjustment mode is manual focus (MF), the focus control device 42 controls the driving of the focus motor 26 based on an operation signal from the lens operation unit 14. Specifically, the driving of the focus motor 26 is controlled such that the focus lens group 22 moves by a movement amount and a movement direction corresponding to the operation of the focus ring 16. In a case where the focus ring 16 is operated, the lens operation unit 14 outputs an operation signal corresponding to the operation direction and the operation amount to the lens microcomputer 40. Meanwhile, in a case where the focus adjustment mode is auto focus (AF), the focus control device 42 controls the driving of the focus motor 26 based on a drive command from the camera main body 100.

The stop control device 44 controls the stop 32 controls the driving of the stop motor 36. In a case where an exposure mode is stop priority and is manual, the stop control device 44 controls the driving of the stop motor 36 based on an operation signal from the lens operation unit 14. Specifically, the driving of the stop motor 36 is controlled such that the F number set by the stop ring 18 is obtained. In a case where the stop ring 18 is operated, the lens operation unit 14 outputs an operation signal corresponding to the set F number to the lens microcomputer 40. Meanwhile, in a case where the exposure mode is a mode (for example, in the case of auto or shutter speed priority) other than stop priority or manual, the stop control device 44 controls of the driving of the stop motor 36 based on a drive command from the camera main body 100.

In a case where the stop 32 is driven, the stop control device 44 drives the stop motor 36 in a predetermined aspect to set the stop 32 to a target opening diameter (target F number), This setting will be described in detail later.

Camera Main Body

The camera main body 100 comprises an image sensor 150, a shutter 154, an analog signal processing unit 220, an analog-to-digital converter (ADC) 222, a digital signal processing unit 224, a phase difference AF processing unit 226, a memory card interface 228, a memory card 230, the main monitor 104, the sub monitor 106, the electronic viewfinder (EVF) 108, the camera operation unit 110, a timepiece unit 140, and a camera microcomputer 250.

Image Sensor

The image sensor 150 images a subject via the interchangeable lens 10. The image sensor 150 is an image sensor having a phase difference detection function. The image sensor having the phase difference detection function comprises a pixel for phase difference detection on an imaging surface in addition to a pixel for normal imaging. Since the image sensor itself having the phase difference detection function is known, the description thereof is omitted.

The driving of the image sensor 150 is controlled by the camera microcomputer 250 via an image sensor drive circuit 152.

Shutter

The shutter 154 is a focal plane shutter. The driving of the shutter 154 is controlled by the camera microcomputer 250 via a shutter drive circuit 156.

Analog Signal Processing Unit

The analog signal processing unit 220 acquires an analog image signal for each pixel output from the image sensor 150, and performs predetermined signal processing (for example, sampling two correlation pile and amplification processing).

ADC

The ADC 222 converts the analog image signals output from the analog signal processing unit 220 into digital image signals, and outputs the digital image signals.

Digital Signal Processing Unit

The digital signal processing unit 224 acquires the digital image signals, and generates image data by performing predetermined signal processing (for example, gradation transformation processing, white balance correction processing, gamma-correction processing, demosaicing processing, and YC conversion processing).

Phase Difference AF Processing Unit

The phase difference auto focus (AF) processing unit 226 acquires a signal of the pixel for phase difference detection, performs predetermined signal processing on the acquired signal, and calculates a phase difference amount. A defocus direction and amount are calculated based on the calculated phase difference amount.

Memory Card Interface and Memory Card

The memory card interface 228 reads and writes data from and in the memory card 230 attached to a card slot under the control of the camera microcomputer 250.

Main Monitor

The main monitor 104 includes an LCD. The display on the main monitor 104 is controlled by the camera microcomputer 250. The camera microcomputer 250 controls the display on the main monitor 104 via an LCD drive circuit 104*a*.

Sub Monitor

The sub monitor 106 includes an LCD. The display on the sub monitor 106 is controlled by the camera microcomputer 250. The camera microcomputer 250 controls the display on the sub monitor 106 via an LCD drive circuit 106*a*.

Electronic Viewfinder

The display unit of the electronic viewfinder (EVF) 108 is an LCD. The display on the electronic viewfinder 108 is controlled by the camera microcomputer 250. The camera microcomputer 250 controls the display on the electronic viewfinder 108 via an LCD drive circuit 108*a*.

Camera Operation Unit

The camera operation unit 110 outputs a signal corresponding to the operation of each operation member to the camera microcomputer 250.

Timepiece Unit

The timepiece unit 140 measures time.

Camera Microcomputer

The camera microcomputer 250 is a microcomputer comprising a CPU, a ROM, and a RAM, and realizes various functions by executing predetermined programs.

Figure 6:
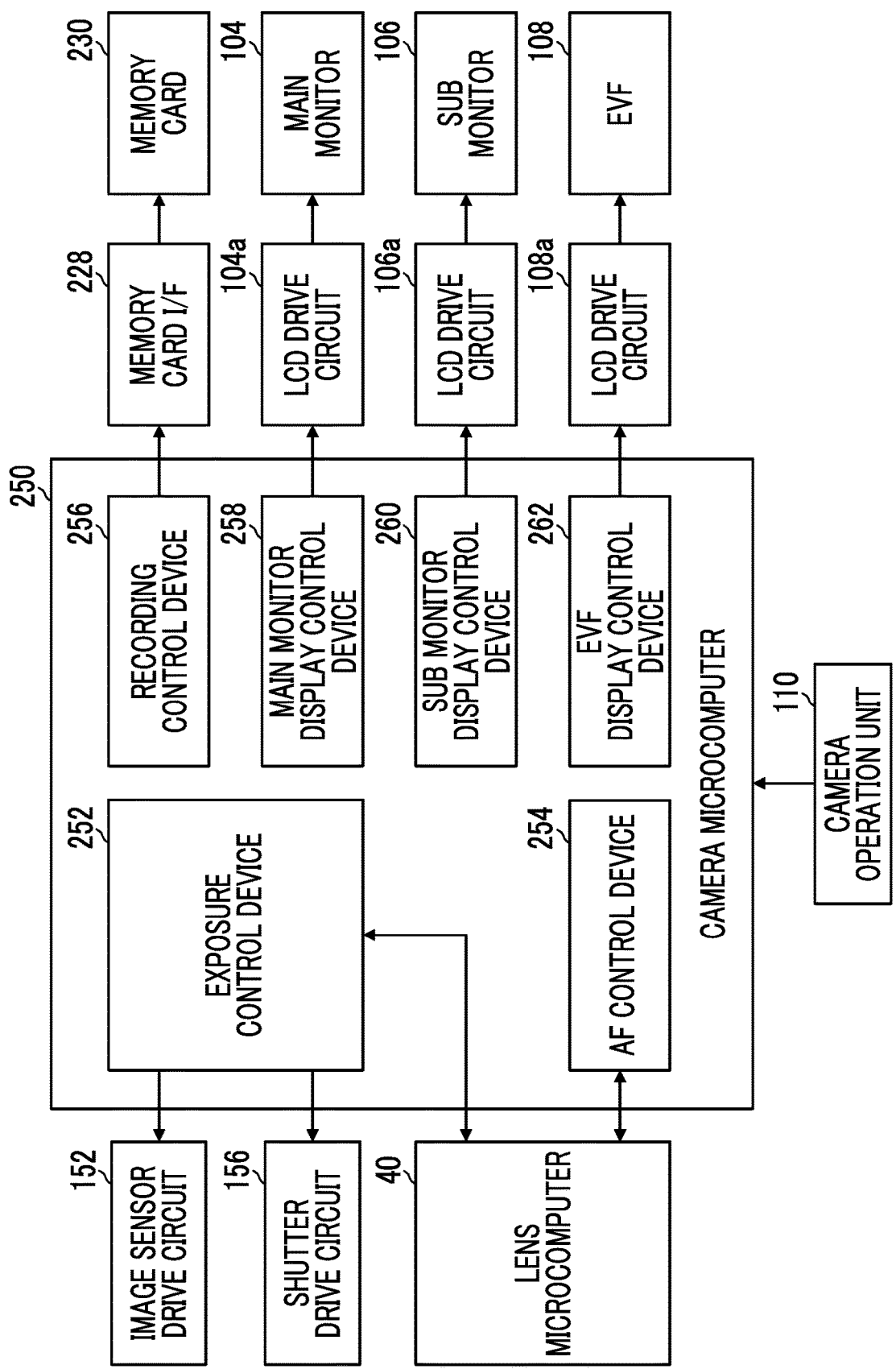
FIG. 6 is a block diagram of main functions realized by a camera microcomputer.

FIG. 6 is a block diagram of main functions realized by the camera microcomputer.

The camera microcomputer 250 functions as an exposure control device 252, an AF control device 254, a recording control device 256, a main monitor display control device 258, a sub monitor display control device 260, and an EVF display control device 262 by executing predetermined programs.

Exposure Control Device

The exposure control device 252 controls an exposure in the case of imaging. The exposure control device 252 detects brightness of the subject based on the image signal obtained from the image sensor 150, and decides an F number and a shutter speed for imaging with a proper exposure.

The F number and the shutter speed are decided according to the exposure mode. In the case of stop priority, the shutter speed for imaging with proper exposure is decided based on the F number set by a person who images. In the case of shutter speed priority, the F number for imaging with proper exposure is decided based on the shutter speed set by the person who images. In the case of auto, the F number and the shutter speed for imaging with proper exposure are decided based on the brightness of the subject. In the case of manual, the F number and the shutter speed are set to the F number and the shutter set by the person who mages.

The exposure control device 252 controls the driving of the image sensor 150, the shutter 154, and the stop 32 such that an image is captured at the obtained F number and shutter speed. A drive command is output to the lens microcomputer 40, and the driving of the stop 32 is controlled by the lens microcomputer 40.

AF Control Device

The AF control device 254 performs automatic focusing. The exposure control device 252 acquires defocus information from the phase difference AF processing unit 226, and performs the automatic focusing based on the acquired defocus information. At this time, the AF control device 254 calculates the amount of movement of the focus lens group 22 for focusing on a main subject based on the defocus information for the main subject, and outputs a drive command to the lens microcomputer 40. The lens microcomputer 40 controls the driving of the focus motor 26 based on the obtained drive command, and moves the focus lens group 22 to a position at which the main subject is focused.

Recording Control Device

The recording control device 256 controls recording of image data obtained by imaging. The recording control device 256 generates an image file in a predetermined format from the image data obtained by imaging, and records the image file on the memory card 230.

Main Monitor Display Control Device

The main monitor display control device 258 controls the display on the main monitor 104. For example, an image captured by the image sensor 150 is displayed on the main monitor 104 in real time according to a live view display instruction. A menu screen is displayed on the main monitor 104 according to a menu screen display instruction.

Sub Monitor Display Control Device

The sub monitor display control device 260 controls the display on the sub monitor 106. The sub monitor display control device 260 acquires information to be displayed on the sub monitor 106, and displays the acquired information on the sub monitor 106 in a predetermined format.

EVF Display Control Device

The EVF display control device 262 controls the display on the EVF 108. In a case where the use of the EVF 108 is selected, the EVF display control device 262 display's the image captured by the image sensor 150 on the EVF 108 in real time.

Stop Control

As described above, in a case where the stop 32 is driven, the stop control device 44 drives the stop motor 36 in a predetermined aspect, and sets the stop 32 to a target opening diameter (target F number). Hereinafter, the driving aspect of the stop motor 36 will be described in detail.

Overview

In the camera 1 according to the present embodiment, in a case where the stop 32 is driven, the stop motor 36 is driven at a high speed up to a position before the stop reaches the target opening diameter, switches the driving aspect to driving at a low speed, and sets the stop 32 to the target opening diameter.

Figure 7:
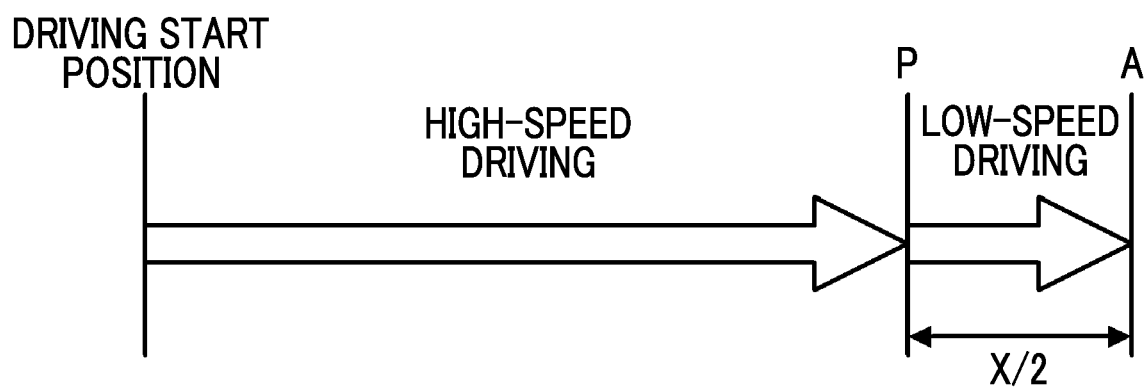
FIG. 7 is a conceptual diagram of driving control of a stop motor.

FIG. 7 is a conceptual diagram of driving control of the stop motor.

It is assumed that a targeted opening diameter (target opening diameter) of the stop 32 is Fn, and a driving stop position of the stop motor 36 at which the opening diameter reaches the target opening diameter Fn is A. The position A is set to a position at which the opening diameter reaches the target opening diameter Fn in a case Where the stop motor 36 is driven at a low speed (first speed).

It is assumed that a position at which the driving of the stop motor 36 is switched from the driving at a high speed (second speed) to the driving at a low speed (first speed) is P. The position P is set to a position of (A−X/2). Here, X is a variation width of the opening diameter caused in a case where the opening diameter reaches the target opening diameter Fn by driving the stop motor 36 at a high speed (second speed). The variation width is a magnitude of an error component having no reproducibility that occurs even though the stop motor 36 is driven under the same condition. The driving stop position of the stop motor 36 with respect to the target opening diameter is set at a center of the variation. That is, the driving stop position of the stop motor 36 for each target opening diameter is set such that the center of the variation is the target opening diameter. Even though the target opening diameters are identical, the variation width varies depending on a driving speed of the stop motor 36, and a speed in the case of driving at a high speed is faster than a speed in the case of driving at a low speed.

The position P at which the driving speed of the stop motor 36 is switched from high speed to low speed is set to a position in front by a half (½) of a variation width X in a case where the stop motor 36 is driven at a high speed from the position A at which the opening diameter reaches the target opening diameter Fn in a case where the stop motor is driven at a low speed.

As stated above, it is possible to accurately set the target opening diameter in a short time by setting a driving condition of the stop motor 36. That is, since the driving can be performed at a high speed as possible, the target opening diameter can be set in a short time. The driving stop position of the stop motor 36 is set to A (=the driving stop position of the stop motor 36 at which the opening diameter reaches the target opening diameter in a case where the stop motor 36 is driven at a low speed), and the position P at which the driving is switched to the low speed is set to (A−X/2). Thus, the variation can be equivalent to the variation in the case of driving at a low speed, and it is possible to accurately set the target opening diameter. That is, since there is a portion at which the blades energized by the driving at a high speed can be pushed at a low speed through the present control, the variation can be equivalent to the variation in the case of driving at a low speed. Accordingly, the target opening diameter can be accurately set. Since the variation width is decided for each target opening diameter, a low-speed driving section can be appropriately set, and the driving can be performed at a high speed as possible.

Stop Control Device

Figure 8:
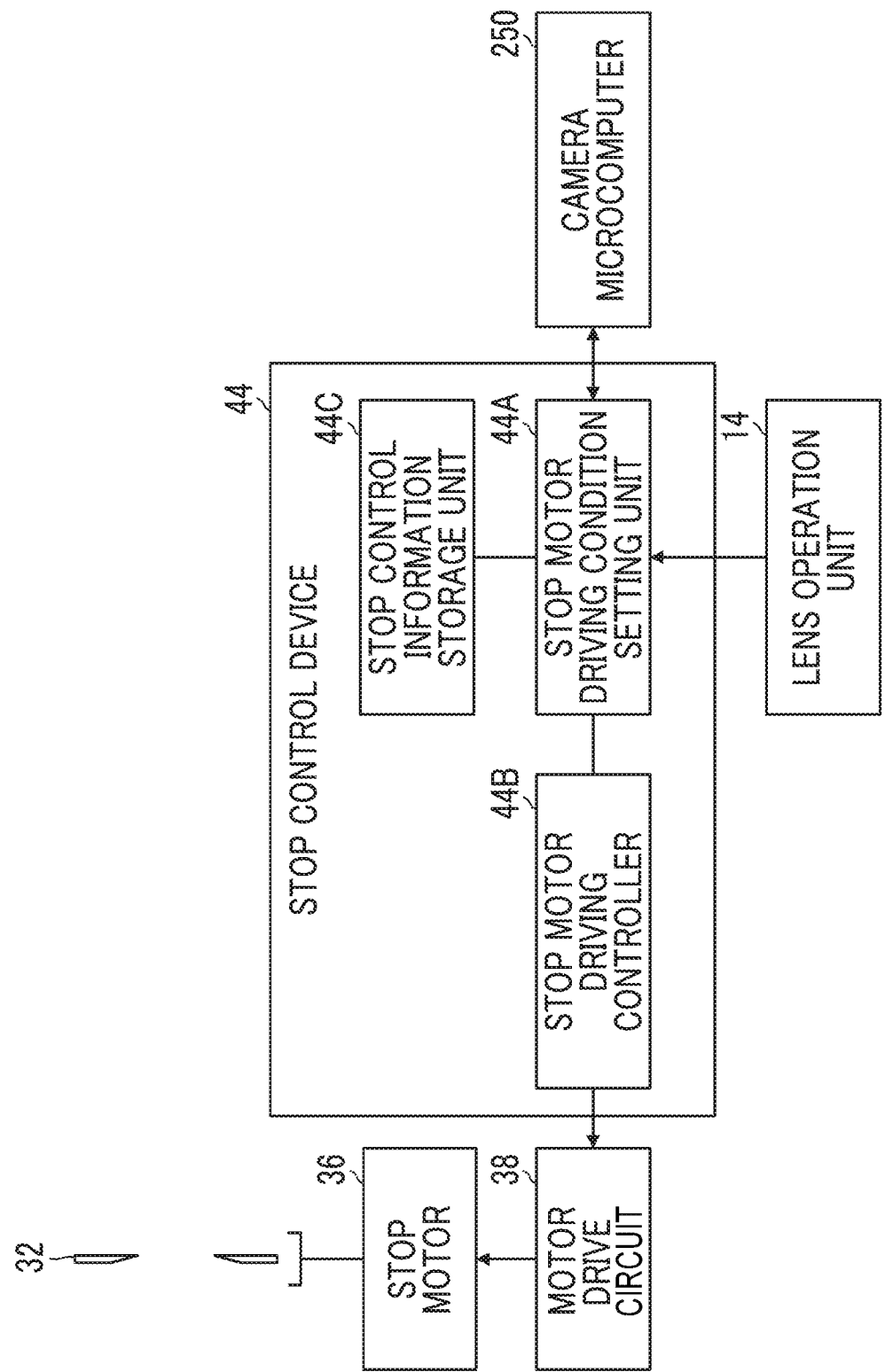
FIG. 8 is a block diagram of functions of a stop control device.

FIG. 8 is a block diagram of functions of the stop control device.

As described above, the function of the stop control device 44 is realized by the lens microcomputer 40 by the lens microcomputer 40 executing a predetermined program (stop control program).

The stop control device 44 comprises a stop motor driving condition setting unit 44A that sets the driving condition of the stop motor 36 required to cause the opening diameter to reach the set target opening diameter, a stop motor driving controller 44B that drives the stop motor 36 under the set driving condition, and a stop control information storage unit 44C that stores information necessary for controlling the stop 32.

Stop Motor Driving Condition Setting Unit

The stop motor driving condition setting unit 44A sets the driving condition of the stop motor 36 based on the set target opening diameter. That is, assuming that the driving stop position of the stop motor 36 at which the opening diameter reaches the target opening diameter in a case where the stop motor 36 is driven at a low speed (first speed) is A and the variation width of the opening diameter caused in a case where the opening diameter reaches the target opening diameter by driving the stop motor 36 is driven at a high speed (second speed is X, the driving stop position of the stop motor 36 is set to A, and the position of (A−X/2) is set to a speed switching position. A section before (A−X/2) is set as a high-speed driving section, and a section after (A−X/2) is set as a low-speed driving section. The high-speed driving section is a section in which the stop motor 36 is driven at high speed (second speed), and the low-speed driving section is a section in which the stop motor 36 is driven at low speed (first speed). In a case where the stop motor 36 is the stepping motor, each position is defined by the number of steps.

The driving stop position A of the stop motor 36 at which the opening diameter reaches the target opening diameter in a case where the stop motor 36 is driven at a low speed (first speed) is obtained in advance by an experiment, and is stored in the stop control information storage unit 44C. This information is obtained for each opening diameter capable of being set by the stop 32, and is stored in the stop control information storage unit 44C in the form of a table.

The driving stop position of the stop motor 36 at which the opening diameter reaches the target opening diameter is different between a case where the stop 32 is driven in an opening direction and a case where the stop is driven in a closing direction.

The variation width X of the opening diameter caused in a case where the opening diameter reaches the target opening diameter by driving the stop motor 36 at a high speed (second speed) is also obtained in advance by an experiment, and is stored in the stop control information storage unit 44C in the form of a table. This information is also obtained for each opening diameter capable of being set in the stop 32, and is stored in the stop control information storage unit 44C.

The variation width is different between a case where the stop 32 is driven in the opening direction and a case where the stop is driven in the closing direction.

Stop Motor Driving Controller

The stop motor driving controller 44B drives the stop motor 36 according to the driving condition set by the stop motor driving condition setting unit 44A.

Stop Control Information Storage Unit

The stop control information storage unit 44C is, for example, a ROM of the lens microcomputer 40, and stores information necessary for controlling the stop 32. As described above, information on the driving stop position A of the stop motor 36 for each opening diameter and information on the variation width X are stored in the stop control information storage unit 44C.

Method of Controlling Stop by Stop Control Device

Next, a method of controlling the stop 32 by the stop control device 44 having the aforementioned configuration will be described.

First, information on the F number (opening diameter) to be set is acquired. The acquired F number (opening diameter) is set as a target F number (a target opening diameter).

In a case where the exposure mode is stop priority or manual, the F number set by the stop ring 18 is used as the F number to be set. In other modes, the F number set on the camera main body side is the F number to be set. In this case, the stop control device 44 acquires the information on the F number to be set from the camera microcomputer 250.

Subsequently, the driving condition of the stop motor 36 is set based on the set target F number. That is, the driving stop position and the speed switching position of the stop motor 36 are set. The driving stop position of the stop motor 36 is set to the driving stop position of the stop motor 36 at which the opening diameter reaches the target opening diameter in a case where the stop motor 36 is driven at a low speed (first speed). The speed switching position is set to the position of (A–X/2).

Subsequently, the stop motor 36 is driven under the set driving condition based on the drive command from the camera main body 100. Accordingly, the stop 32 is operated, and is set to the set F number (opening diameter).

It is possible to accurately set the target opening diameter in a short time by driving in this manner.

Operation of Camera

The camera 1 is realized by attaching the interchangeable lens 10 to the camera main body 100. The camera 1 prepares for imaging by pushing the shutter button 114 provided on the camera main body 100 halfway, and performs main imaging (imaging for recording) by fully pushing the shutter button.

In a case where the focus adjustment mode of the camera 1 is auto focus and the shutter button 114 is pushed halfway, the AF control is performed, and the main subject is focused. In a case where the shutter button 114 is pushed halfway, photometric processing is performed, and the F number and the shutter speed for imaging with proper exposure are decided.

In a case where the shutter button 114 is pushed halfway and then fully pushed, the main imaging is performed. First, the stop 32 is driven so as to have the set F number. Thereafter, the shutter 154 and the image sensor 150 are driven, and the exposure is performed at the set shutter speed.

Predetermined signal processing is performed on the image signal obtained by the exposure, and the processed image signal is recorded as an image file in a predetermined format on the memory card 230.

Modification Example

Data of Variation Width

As described above, the data of the variation width X is obtained in advance for each opening diameter capable of being set in the stop 32 and is stored in the stop control information storage unit 44C.

In a case where the variation width is obtained, the variation width may be obtained by actually measuring all the opening diameters capable of being set in the stop 32. For example, the variation width of each opening diameter may be obtained by actually measuring several opening diameters and obtaining the tendency of the occurrence of the variation from the measurement result.

Figure 9:
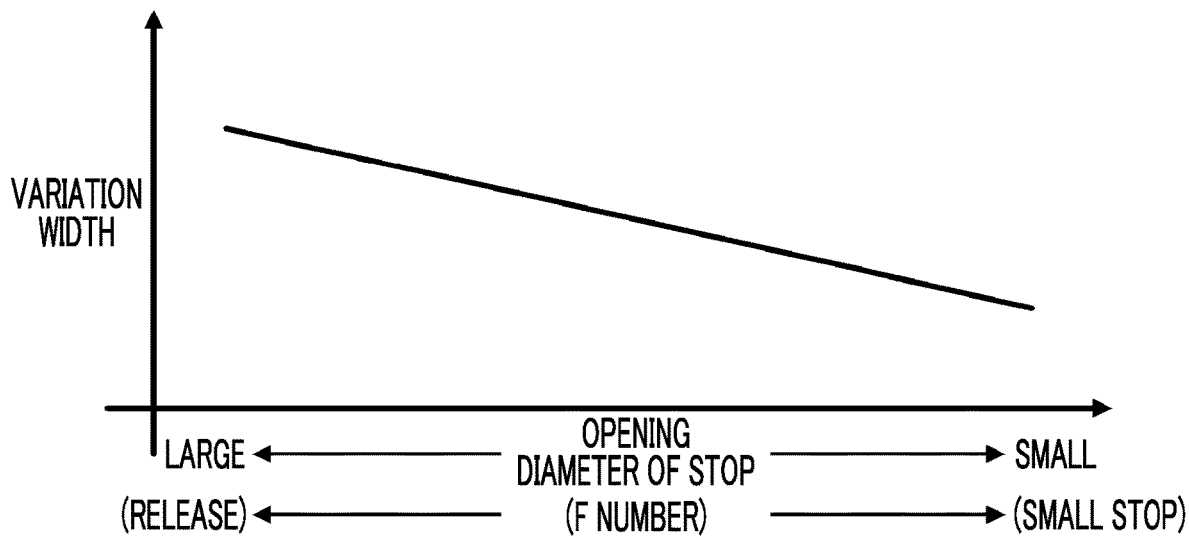
FIG. 9 is a graph showing a relationship between an opening diameter of a stop and a variation width.

FIG. 9 is a graph representing a relationship between the opening diameter of the stop and the variation width. In this graph, a lateral axis indicates the opening diameter (F number) of the stop, and a vertical axis indicates the variation width.

As shown in this graph, there is a predetermined relationship between the opening diameter and the variation width. As the opening diameter becomes smaller, the variation width becomes narrower (as the stop becomes smaller, the variation width becomes narrower). This is because as the opening diameter of the stop 32 becomes smaller, the stop leaf blades are further overlapped, and friction becomes larger.

As described above, since the opening diameter and the variation width have the predetermined relationship, the variation width may be actually measured for several opening diameters, the tendency of the occurrence of the variation may be obtained from the measurement result, and the variation width of each opening diameter may be obtained. For example, in a case where the F number can be changed in steps of ⅓ step, the variation width is obtained step by step, and the tendency of the occurrence of the variation is obtained from the measurement result. As for the F number between the steps, the variation width is obtained from the obtained occurrence tendency.

Instead of retaining the data of the variation width in the form of the table, a function may be obtained from the occurrence tendency, and the data may be retained in the form of the function.

Second Embodiment

In the present embodiment, the driving condition of the stop motor 36 is changed according to the required accuracy of the opening diameter. Specifically, it is determined whether or not the variation width of the opening diameter caused in a case where the stop motor 36 is driven at a high speed (second speed) is within an allowable range for the set target opening diameter, and the stop motor 36 is set to be driven at a high speed in a case where the variation width is within the allowable range. The allowable range of the variation is decided in advance, and is stored in the stop control information storage unit 44C.

Configuration

A basic configuration of the stop control device 44 is the same as that of the first embodiment. Accordingly, only differences from the first embodiment will be described below.

The stop motor driving condition setting unit 44A determines whether or not the variation width of the opening diameter caused in a case where the stop motor 36 is driven at a high speed (second speed) is within the allowable range for the set target opening diameter. In a case where the variation width is within the allowable range, the stop motor 36 is set to be driven at a high speed.

In a case where the stop motor 36 is driven at a high speed, the driving stop position of the stop motor 36 is set to a position at which the opening diameter reaches the target opening diameter in a case where the stop motor 36 is driven at a high speed (second speed). The driving stop position of the stop motor 36 at which the opening diameter reaches the target opening diameter in a case where the stop motor 36 is driven at a high speed (second speed) is obtained in advance by an experiment, and is stored in the stop control information storage unit 44C in the form of a table. This information is obtained for each opening diameter capable of being be set in the stop 32, and is stored in the stop control information storage unit 44C. The driving stop position of the stop motor 36 at which the opening diameter reaches the target opening diameter is different between a case where the stop 32 is driven in an opening direction and a case where the stop is driven in a closing direction.

Actions

Figure 10:
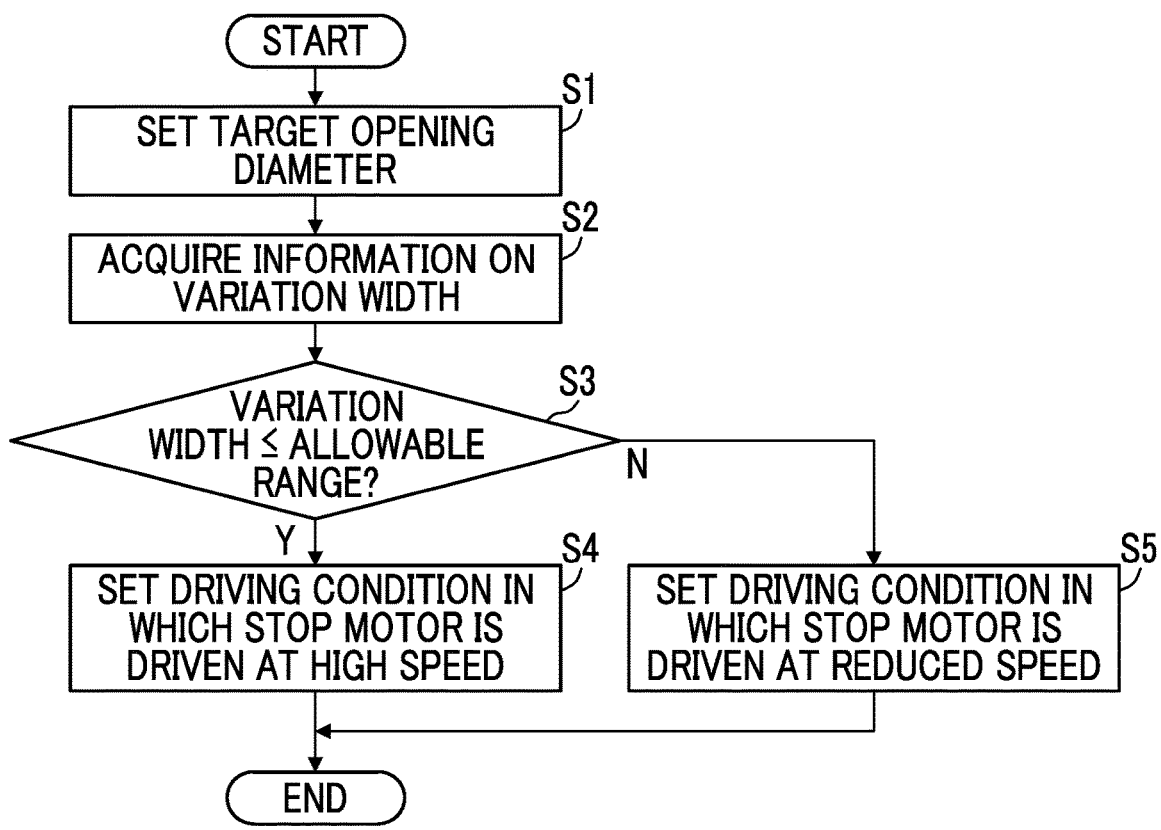
FIG. 10 is a flowchart showing a procedure for setting a driving condition of the stop motor in the stop control device.

FIG. 10 is a flowchart showing a procedure for setting the driving condition of the stop motor in the stop control device according to the present embodiment.

First, the target opening diameter is set from the set F number (step S1).

Subsequently, the information on the variation width X is acquired based on the set target opening diameter (step S2). The variation width X is a variation width of the opening diameter caused in a case where the opening diameter reaches the target opening diameter by driving the stop motor 36 at a high speed (second speed).

Subsequently, it is determined whether or not the acquired variation width X is within the allowable range (step S3).

In a case where the acquired variation width X is within the allowable range (the variation width≤the allowable range), the driving condition is set so as to drive the stop motor 36 at a high speed (step S4). In this case, the stop motor driving condition setting unit 44A sets the driving stop position of the stop motor 36 to the position at which the opening diameter reaches the target opening diameter in a case where the stop motor 36 is driven at a high speed (second speed). The setting is performed such that the stop motor 36 is driven at a high speed (second speed) up to the driving stop position.

Meanwhile, in a case where the acquired variation width X exceeds the allowable range (variation width>allowable range), the driving condition is set such that the stop motor 36 is driven at a reduced speed (step S5). The setting in this case is performed in the same procedure as the procedure described in the first embodiment. That is, the position A at which the opening diameter reaches the target opening diameter in a case where the stop motor 36 is driven at a low speed (first speed) is set to the driving stop position of the stop motor 36, and the position (A−X/2) is set as the speed switching position.

As stated above, in the present embodiment, the driving condition of the stop motor 36 is changed according to the required accuracy of the opening diameter. Accordingly, the stop 32 can be appropriately driven. That is, in a case where the variation width is within the allowable range, since the stop motor can be driven without reducing the speed, the stop 32 can be set to the target opening diameter at a higher speed. Meanwhile, in a case where the variation width exceeds the allowable range, the stop motor is driven at a reduced speed, and thus, the target opening diameter can be accurately set while being driven at a high speed at possible.

Modification Example

The allowable range may be variable. For example, as a control mode of the stop 32, an accuracy priority mode and a speed priority mode are prepared, and can be selected by the user. In a case where the accuracy priority mode is selected, the setting is performed such that the allowable range is narrowed for the allowable range as a reference. Meanwhile, in a case where the speed priority mode is selected, the setting is performed such that the allowable range is expanded for the allowable range as the reference, or the setting of the allowable range is canceled. Accordingly, the stop 32 can be controlled according to the intention of the user.

Third Embodiment

The amount of driving of the stop motor 36 is different between a case where the stop 32 is reduced by one step and a case where the stop is reduced from the minimum to the maximum at once. In a case where the number of steps by which the stop 32 is reduced is small, that is, in a case where the amount of change in the opening diameter is small, the stop 32 can be set to the target opening diameter in a short time without driving the stop motor 36 at a high speed.

In the stop control device according to the present embodiment, an operation speed of the stop 32 is switched according to the amount of change in the opening diameter. Specifically, in a case where the amount of change in the opening diameter is equal to or less than a first threshold value, the stop 32 is set to be driven at a low speed.

Configuration

Figure 11:
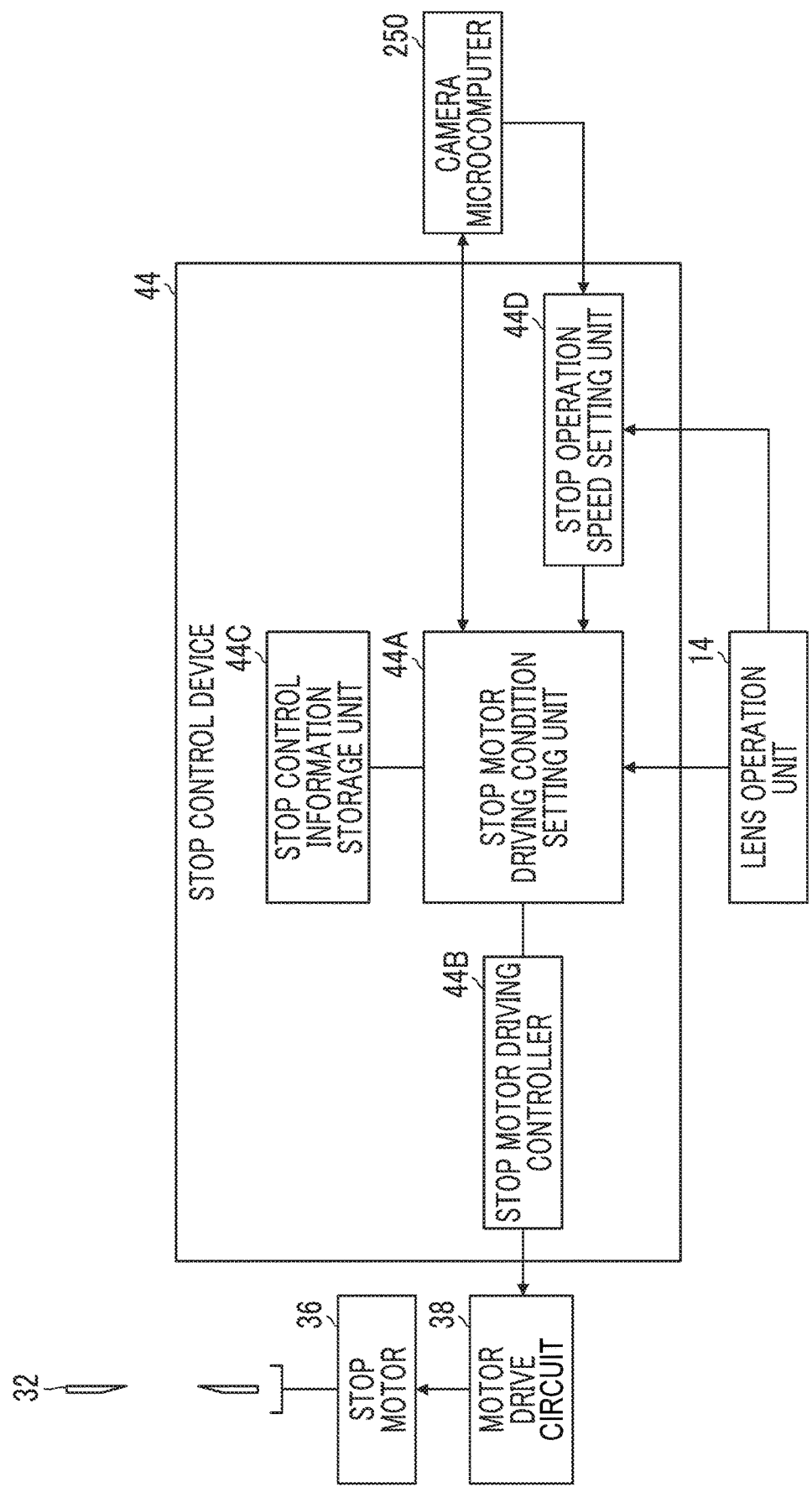
FIG. 11 is a block diagram of functions of the stop control device.

FIG. 11 is a block diagram of functions of the stop control device according to the present embodiment.

As shown in FIG. 11, the stop control device 44 according to the present embodiment further comprises a stop operation speed setting unit 44D that sets the operation speed of the stop 32.

In a case where the amount of change in the F number (opening diameter) is equal to or less than the first threshold value, the stop operation speed setting unit 44D sets the stop 32 to be operated at a low speed. The stop operation speed setting unit 441) calculates the amount of change in the F number (opening diameter) required to change the current F number to the target F number (target opening diameter) based on the set target F number (the target opening diameter). It is determined whether or not the calculated amount of change is equal to or less than the first threshold value. In a case where the amount of change is equal to or less than the first threshold value, the stop operation speed setting unit 44D sets the stop 32 to be driven at a low speed. Meanwhile, in a case where the amount of change in the F number (opening diameter) exceeds the first threshold value, the stop operation speed setting unit 44D sets the stop 32 to be driven at a high speed.

In a case where the operation speed of the stop 32 is set to a low speed, the stop motor driving condition setting unit 44A sets the stop motor 36 to be driven at a low speed (first speed). Meanwhile, in a case where the operation speed of the stop 32 is set to a high speed, the driving condition of the stop motor 36 is set according to the required accuracy of the opening diameter. That is, it is determined whether or not the variation width of the opening diameter caused in a case where the stop motor 36 is driven at a high speed (second speed) for the set target F number (target opening diameter) is within the allowable range, and the setting is such that the stop motor 36 is driven at a high speed (second speed) in a case where the variation width is within the range. Meanwhile, in a case where the variation width exceeds the allowable range, the stop motor 36 is set to be driven at a reduced speed.

Actions

Figure 12:
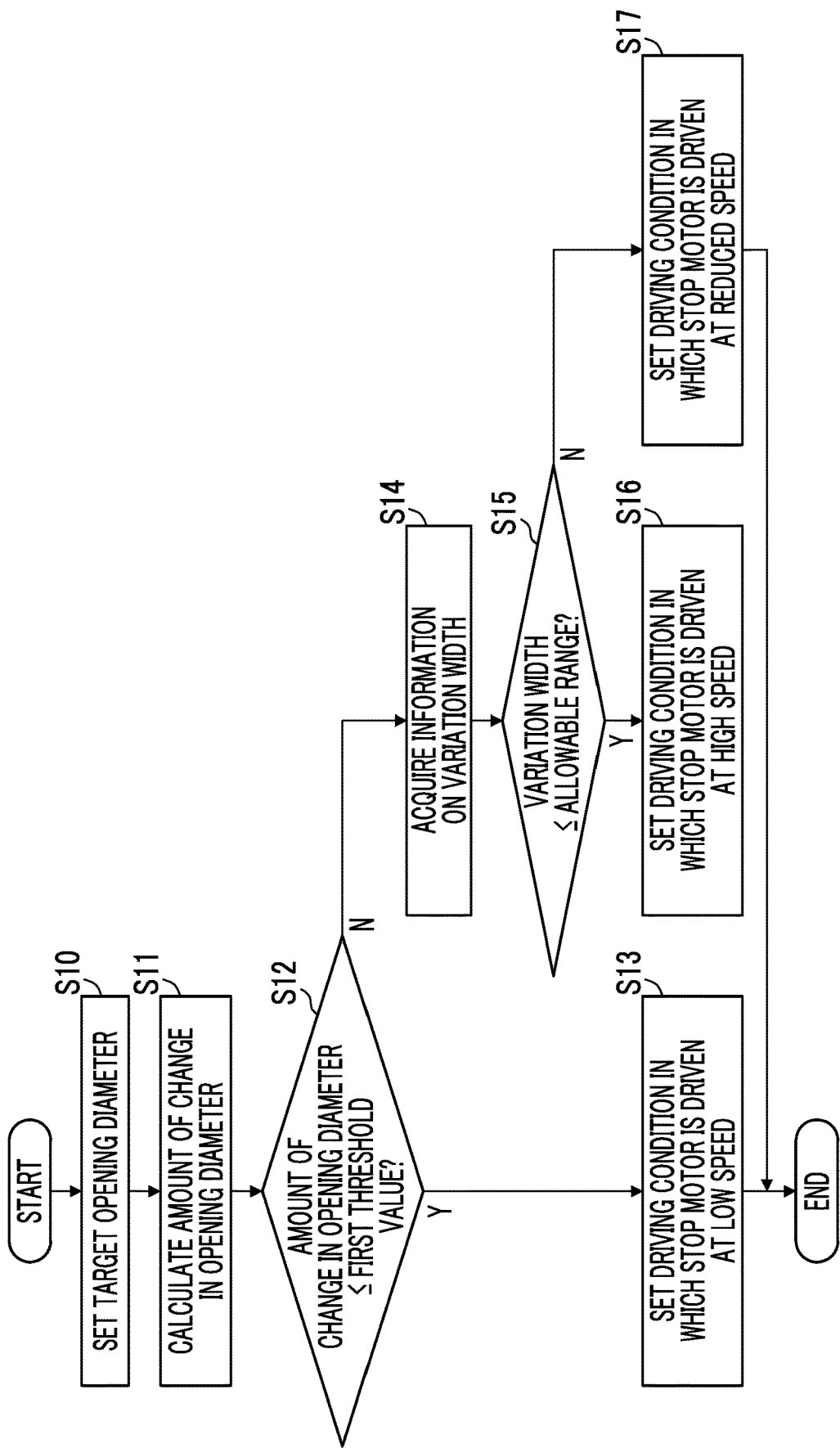
FIG. 12 is a flowchart showing a procedure for setting the driving condition of the stop motor in the stop control device.

FIG. 12 is a flowchart showing a procedure for setting the driving condition of the stop motor in the stop control device according to the present embodiment.

First, the target opening diameter (target F number) is set from the set F number (step S10).

Subsequently, the amount of change in the opening diameter of the stop 32 required for setting the current opening diameter to the target opening diameter is calculated (step S11).

Subsequently, it is determined whether or not the calculated amount of change in the opening diameter is equal to or less than the first threshold value (step S12).

In a case where the amount of change in the opening diameter is equal to or less than the first threshold value (the amount of change in the opening diameter≤the first threshold value), the driving condition is set such that the stop motor 36 is driven at a low speed (first speed) (step S13). In this case, the stop motor driving condition setting unit 44A sets the driving stop position of the stop motor 36 to the position at which the opening diameter reaches the target opening diameter in a case where the stop motor 36 is driven at a low speed (first speed). The setting is performed such that the stop motor 36 is driven at a low speed (first speed) up to the driving stop position.

Meanwhile, in a case where the amount of change in the opening diameter exceeds the first threshold value (the amount of change in the opening diameter>the first threshold value), the information on the variation width X is acquired based on the set target opening diameter (step S14). The variation width X is a variation width of the opening diameter caused in a case where the opening diameter reaches the target opening diameter by driving the stop motor 36 at a high speed (second speed).

Subsequently, it is determined whether or not e acquired variation width X is within the allowable range (step S15).

In a case where the acquired variation width X is within the allowable range (the variation width≤the allowable range), the driving condition is set such that the stop motor 36 is driven at a high speed (step S16). In this case, the stop motor driving condition setting unit 44A sets the driving stop position of the stop motor 36 to the position at which the opening diameter reaches the target opening diameter in a case where the stop motor 36 is driven at a high speed (second speed). The setting is performed such that the stop motor 36 is driven at a high speed (second speed) up to the driving stop position.

Meanwhile, in a case where the acquired variation width X exceeds the allowable range (the variation width>the allowable range), the driving condition is set such that the stop motor 36 is driven at a reduced speed (step S17). The setting in this case is performed in the same procedure as the procedure described in the first embodiment. That is, the position A at which the opening diameter reaches the target opening diameter in a case where the stop motor 36 is driven at a low speed (first speed) is set to the driving stop position of the stop motor 36, and the position (A−X/2) is set as the speed switching position.

As described above, in accordance with the stop control device 44 according to the present embodiment, the operation speed of the stop 32 is switched according to the amount of change in the opening diameter. Thus, the driving of the stop 32 can be more appropriately controlled.

Modification Example

Although it has been described in the aforementioned embodiment that in a case where the amount of change in the opening diameter is equal to or less than the first threshold value, the stop 32 is set to be driven at a low speed, the condition for driving the stop 32 at a low speed is not limited thereto. It is possible to adopt a configuration in which the stop 32 is forcibly driven at a low speed according to the setting of the user.

The operation speed of the stop 32 may be switched by focusing on an operation sound of the stop 32. For example, as one of the functions of the camera, a mode in which the operation sound is not generated as possible (for example, a silent mode) is prepared, and in a case where the mode is selected, the stop 32 is set to be forcibly driven at a low speed.

The operation speed of the stop 32 may be forcibly set to the low speed under the condition in which it is important to set the operation sound of the stop 32 to be small. For example, in a case where motion picture imaging or continuous AF is performed, the operation speed of the stop 32 may be forcibly set to the low speed.

Fourth Embodiment

Figure 13:
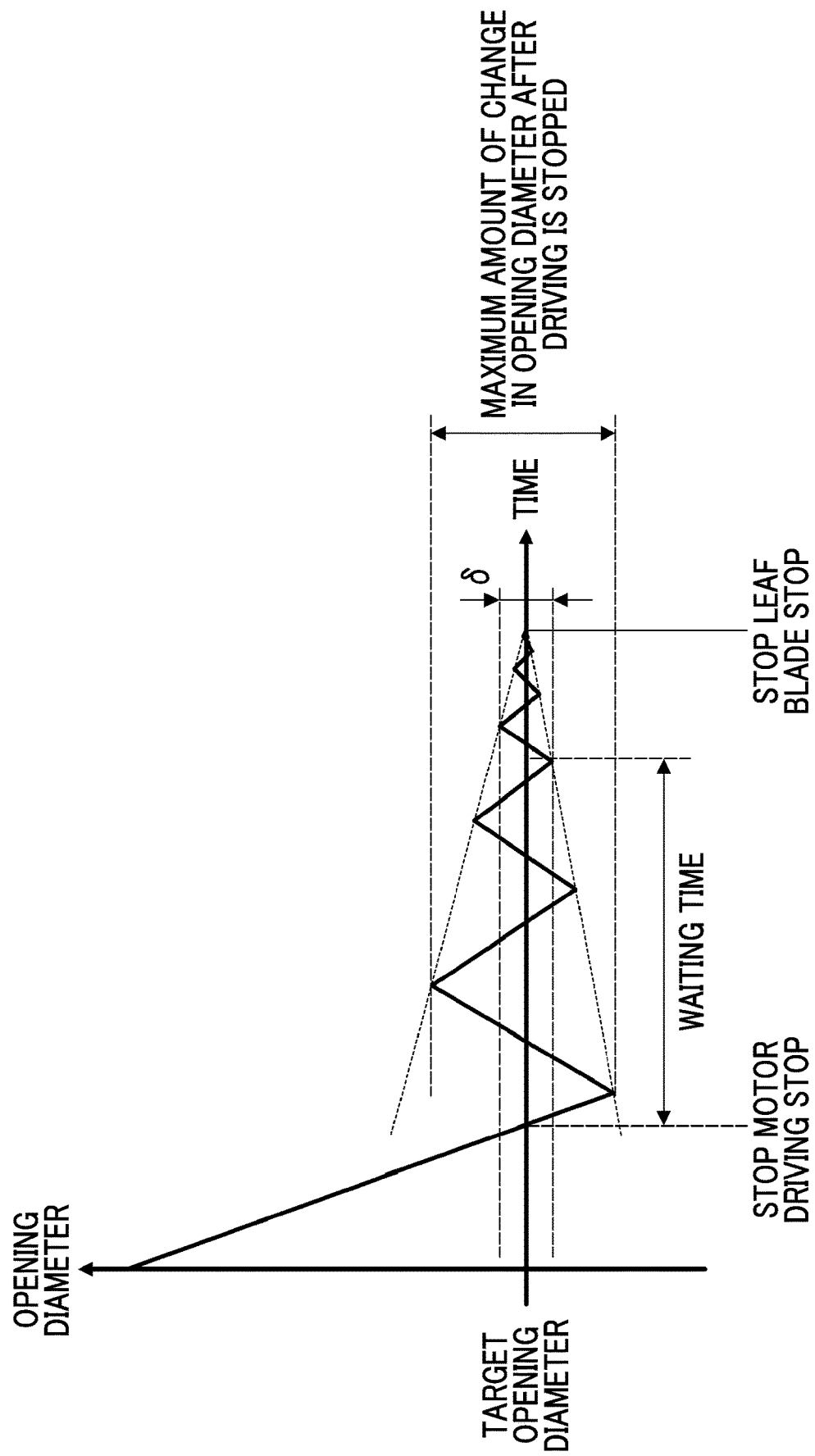
FIG. 13 is a graph showing a transition of the change in the opening diameter after the driving of the stop motor is stopped.

FIG. 13 is a graph showing a transition of a change in the opening diameter after the driving of the stop motor stops. In this graph, a lateral axis indicates time, and a vertical axis indicates the opening diameter of the stop.

As shown in this graph, in a case where the stop motor 36 is driven at a high speed and stops in the setting of the stop 32 to the target opening diameter, a predetermined time is required until the stop leaf blade 32a stops completely. In a case where the exposure is started before the stop leaf blade 32a stops completely, an accurate exposure is not obtained.

The camera according to the present embodiment sets a waiting time before the start of the exposure as necessary. Specifically, information on the driving speed of the stop motor 36 before the driving is stopped is acquired, and is compared with a second threshold value. In a case where the driving speed of the stop motor 36 before the driving is stopped is equal to or greater than the second threshold value, a waiting time is set between the stoppage of the driving of the stop motor 36 and the start of the exposure. In a case where the waiting time is set, even though the driving of the stop motor 36 is stopped, the exposure is not immediately started, and the exposure is started after the elapse of the waiting time. In a case where the waiting time is not set, the exposure is started without the waiting time after the driving of the stop motor 36 is stopped.

A time sufficient to converge the shake of the stop leaf blade 32a is set as the waiting time. The second threshold value is appropriately set in consideration of influence on the exposure. As described above, in the camera according to the present embodiment, the stop motor 36 is driven at two types of speeds (low speed (first speed) and high speed (second speed)). Accordingly, the second threshold value is set such that the waiting time is set in a case where the speed before the driving is stopped is the high speed (second speed) (first speed<second threshold value<second speed).

An exposure start condition is set by the exposure control device 252. As described above, the exposure control device 252 is realized by the camera microcomputer 250 by the camera microcomputer 250 executing a predetermined control program (exposure control program).

Configuration

Figure 14:
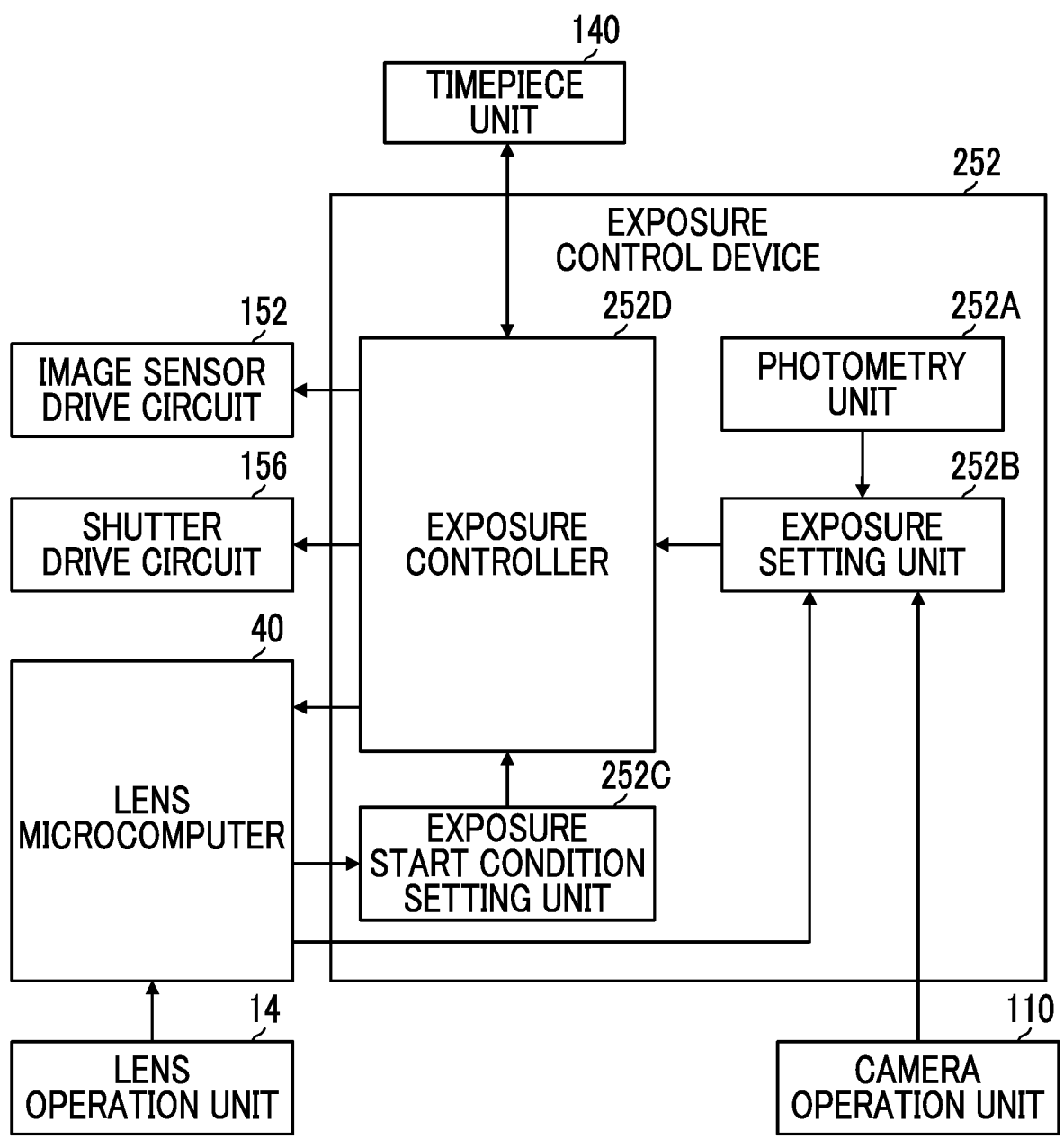
FIG. 14 is a block diagram of functions of an exposure control device.

FIG. 14 is a block diagram of main functions of the exposure control device according to the present embodiment.

The exposure control device 252 includes a photometry unit 252A that detects the brightness of the subject, an exposure setting unit 252B that sets the exposure, an exposure start condition setting unit 252C that sets the exposure start condition, and an exposure controller 252D that exposes the image sensor 150 with the set exposure and start condition.

Photometry Unit

The photometry unit 252A detects the brightness of the subject based on an image signal obtained from the image sensor 150.

Exposure Setting Unit

The exposure setting unit 252B sets the F number and the shutter speed for imaging with proper exposure based on the photometry result obtained by the photometry unit 252A.

The F number and the shutter speed are decided according to the exposure mode. In the case of stop priority, the shutter speed for imaging with proper exposure is decided based on the F number set by a person who images. In the case of shutter speed priority, the F number for imaging with proper exposure is decided based on the shutter speed set by the person who images. In the case of auto, the F number and the shutter speed for imaging with proper exposure are decided based on the brightness of the subject. In the case of manual, the F number and the shutter speed are set to the F number and the shutter set by the person who images.

Exposure Start Condition Setting Unit

The exposure start condition setting unit 252C sets the exposure start condition based on information on the driving condition of the stop motor 36. The exposure start condition setting unit 252C acquires the information on the driving condition of the stop motor 36 from the lens microcomputer 40, and acquires the information on the driving speed before the driving of the stop motor 36 is stopped. It is determined whether or not it is necessary to set the waiting time based on the acquired information on the speed before the driving is stopped, and the exposure start condition is set. Specifically, it is determined whether or not the acquired speed before the driving is stopped is equal to or greater than the second threshold value. In a case where the speed of the stop motor 36 before the driving is stopped is equal to or greater than the second threshold value, the setting of the waiting time is performed. Meanwhile, in a case where the speed of the stop motor 36 before the driving is stopped is less than the second threshold value, the setting of no waiting time is performed.

In the camera according to the present embodiment, since the stop motor 36 is driven at two types of speeds (low speed (first speed) and high speed (second speed)), the second threshold value is set such that the waiting time is set in a case where the speed before the driving is stopped is the high speed (second speed) (first speed<second threshold value<second speed).

Exposure Controller

The exposure controller 252D controls the driving of the image sensor 150, the shutter 154, and the stop 32 such that the exposure is started under the set start condition and the exposure is performed at the set F number and shutter speed.

A drive command is output to the lens microcomputer 40, and the driving of the stop 32 is controlled by the lens microcomputer 40.

As described above, the waiting time is set to a time sufficient to converge the shake of the stop leaf blade 32a. In the present embodiment, in the case where the stop motor 36 is driven under the condition in which the amount of change in the opening diameter is the largest, a time from the stoppage of the driving of the stop motor 36 to converge the change of the opening diameter of the stop 32 to a predetermined value or less is set as the waiting time. That is, as shown in FIG. 13, a time to converge the amount of change in the opening diameter of the stop 32 to be equal to or less than an allowable value δ is set as the waiting time. This time is obtained in advance by an experiment, and is stored in the ROM of the camera microcomputer 250.

Actions

Figure 15:
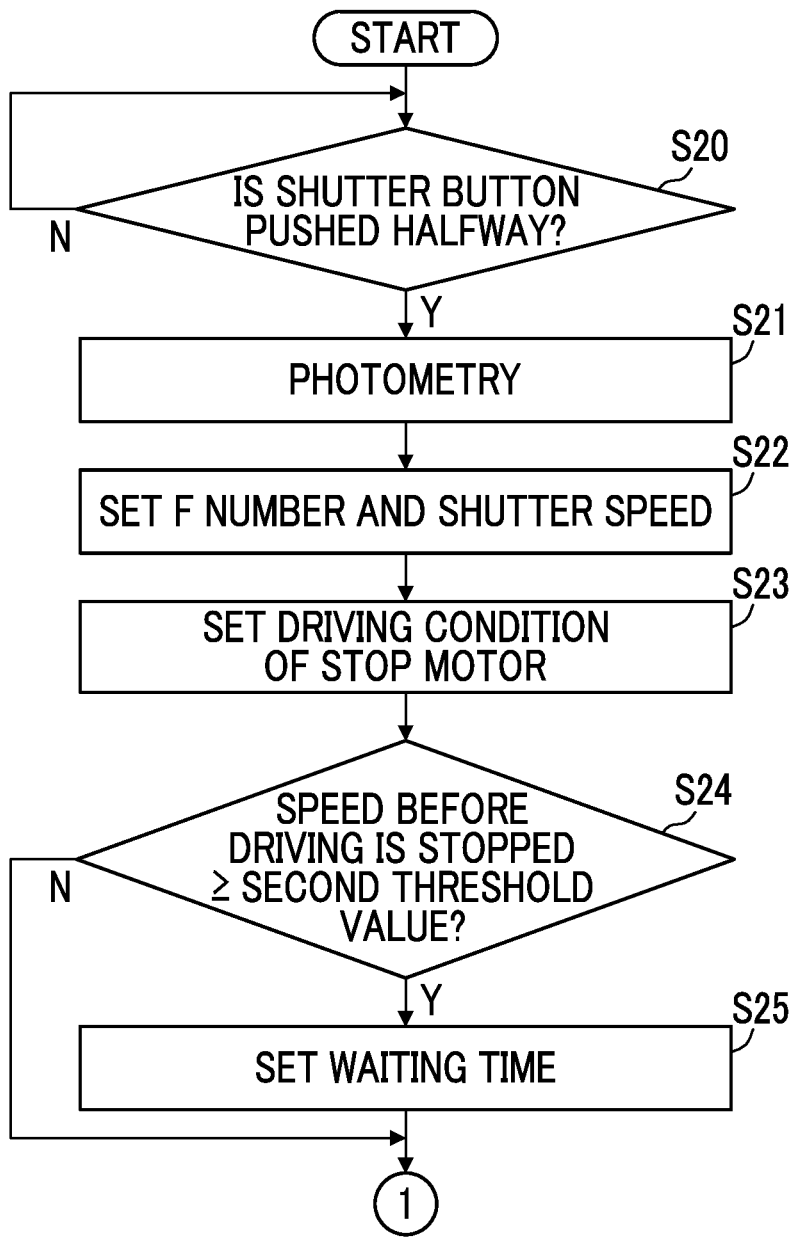
FIG. 15 is a flowchart showing a procedure of exposure control.
Figure 16:
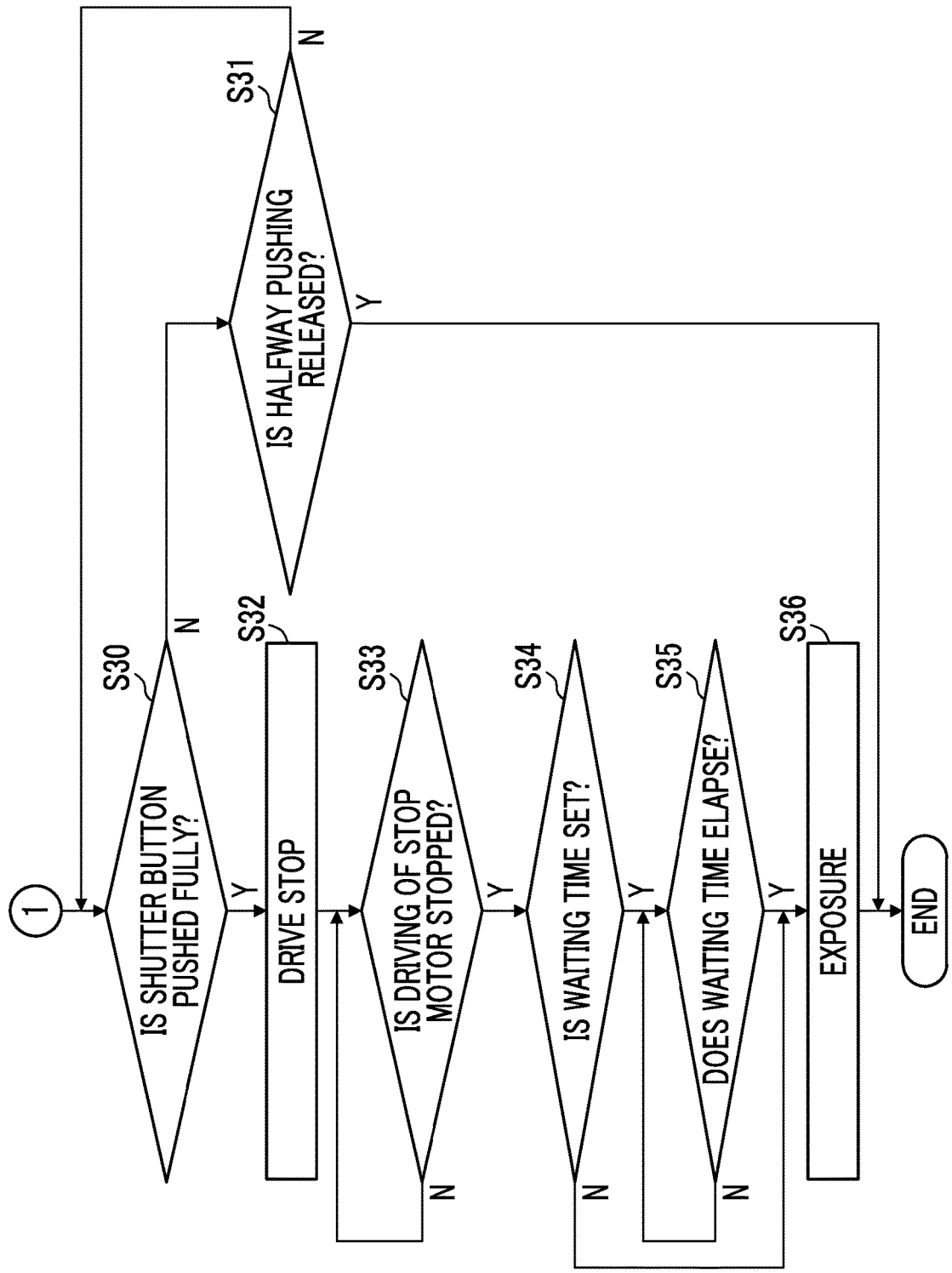
FIG. 16 is a flowchart showing a procedure of the exposure control.

FIGS. 15 and 16 are flowcharts showing a procedure of the exposure control.

As shown in FIG. 15, first, it is determined whether or not the shutter button 114 is pushed halfway (step S20).

In a case where the shutter button 114 is pushed halfway, the photometric processing is performed, and the brightness of the subject is detected (step S21). The F number and the shutter speed are set based on the detected brightness of the subject (step S22). In a case where the exposure mode is manual, the F number and the shutter speed are set to the F number and the shutter set by the user.

In a case where the F number is set, the driving condition of the stop motor 36 is set based on the set F number (step S23). It is determined whether or not the waiting time is set based on the set driving condition of the stop motor. That is, it is determined whether or not the speed of the stop motor 36 before the driving is stopped (speed before stop) is equal to or greater than the second threshold value (step S24). This determination is synonymous with determination of whether or not the speed of the stop motor 36 before the driving is stopped is the high speed.

In a case where the speed of the stop motor 36 before the driving is stopped is equal to or greater than the second threshold value (the speed before the driving is stopped≥the second threshold value), the waiting time is set before the exposure is started (step S25). In the case of the camera according to the present embodiment, in a case where the speed of the stop motor 36 before the driving is stopped is the high speed (second speed), the waiting time is set before the exposure is started.

Meanwhile, in a case where the speed of the stop motor 36 before the driving is stopped is less than the second threshold value (the speed before the driving is stopped<the second threshold value), the waiting time is not set. In the case of the camera of the present embodiment, in a case where the speed of the stop motor 36 before the driving is stopped is the low speed (first speed), there is no waiting time.

Thereafter, as shown in FIG. 16, it is determined whether or not the shutter button 114 is fully pushed (step S30). In a case where it is determined that the shutter button is not fully pushed, it is determined whether or not the halfway pushing is released (step S31), in a case where the halfway pushing is released, the processing of the exposure control is ended.

Meanwhile, in a case where the shutter button 114 is fully pushed, processing for the exposure is started. First, the stop 32 is driven (step S32). That is, the stop motor 36 is driven under the set driving conditions, and the stop 32 is set to the set target F number.

Thereafter, it is determined whether or not the driving of the stop motor 36 is stopped (step S33). In a case where the driving of the stop motor 36 is stopped, it is determined whether or not the waiting time is set (step S34).

Here, in a case where it is determined that the waiting time is set, the exposure is started after the elapse of the waiting time. In this case, in a case where the driving of the stop motor 36 is stopped, a time elapsed from the stoppage of the driving is measured. It is determined whether or not the waiting time elapses (step S35). In a case where the waiting time elapses, the exposure is performed (step S36). That is, the exposure is performed at the set shutter speed under the set F number.

Meanwhile, in a case where it is determined that the waiting time is not set, the exposure is performed without waiting for the elapse of the waiting time (step S36). That is, the exposure is started immediately after the driving of the stop motor 36 is stopped.

As described above, according to the exposure control device 252 according to the present embodiment, the exposure start condition is switched according to the speed of the stop motor 36 before the driving is stopped, and in a case where the stop motor is driven at a high speed, the elapse of a predetermined waiting time is waited for, and the exposure is started. Accordingly, it is possible to perform imaging with accurate exposure.

Modification Example

Although it has been described in the aforementioned embodiment that in a case where the waiting time is set, the waiting times having the same length are uniformly set, the waiting times may be set individually according to the driving condition of the stop motor 36. Accordingly, the waiting time can be set more appropriately.

Fifth Embodiment

In the present embodiment, the speed of the stop motor 36 before the driving is stopped is equal to or greater than the second threshold value, and the maximum amount of change in the opening diameter of the stop 32 after the driving of the stop motor 36 is stopped is equal to or greater than a third threshold value, the waiting time is set. Accordingly, even though the speed of the stop motor 36 before the driving is stopped is the high speed, the waiting time is not set in a case where the amount of change in the opening diameter is small (in a case where the maximum amount of change is less than the third threshold value).

Even though the speed of the stop motor 36 before the driving is stopped is high, the influence on the exposure is small in a case where the amount of change in an opening amount is small. Accordingly, in such a case, the exposure is started immediately after the driving of the stop motor 36 is stopped without setting the waiting time. Accordingly, it is possible to prevent the start of the exposure from being unnecessarily long.

Configuration

The basic configuration of the exposure control device according to the present embodiment is the same as that of the exposure control device described in the fourth embodiment. The exposure start condition setting unit 252C sets the exposure start condition.

The amount of change in the opening diameter is correlated with the variation width. The exposure start condition setting unit 252C acquires the information on the variation width of the opening diameter caused in a case where the opening diameter reaches the target opening diameter by driving the stop motor 36 at a high speed (second speed), and calculates the maximum amount of change in the opening diameter from the acquired variation width.

The third threshold value is set in consideration of the influence on the exposure.

Actions

Figure 17:
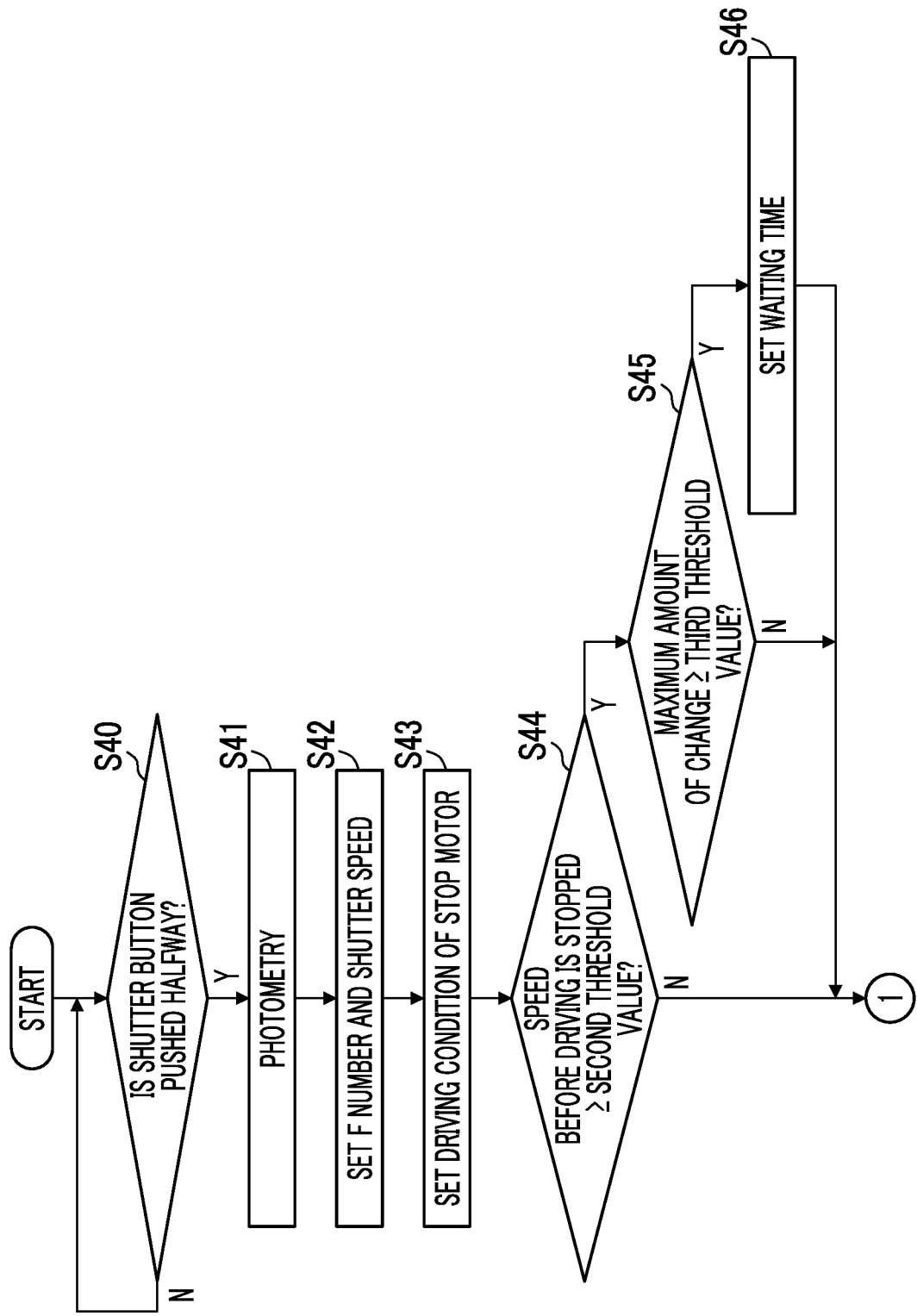
FIG. 17 is a flowchart showing a procedure of the exposure control.

FIGS. 17 and 16 are flowcharts showing a procedure of the exposure control.

As shown in FIG. 17, first, it is determined whether or not the shutter button 114 is pushed halfway (step S40).

In a case where the shutter button 114 is pushed halfway, the photometric processing is performed, and the brightness of the subject is detected (step S41). The F number and the shutter speed are set based on the detected brightness of the subject (step S42). In a case where the exposure mode is manual, the F number and the shutter speed are set to the F number and the shutter set by the user.

In a case where the F number is set, the driving condition of the stop motor 36 is set based on the set F number (step S43). It is determined whether or not the waiting time is set based on the set driving condition of the stop motor. That is, it is determined whether or not the speed of the stop motor 36 before the driving is stopped (the speed before the driving is stopped) is equal to or greater than the second threshold value (step S44). This determination is synonymous with determination of whether or not the speed of the stop motor 36 before the driving is stopped is the high speed.

In a case where the speed of the stop motor 36 before the driving is stopped is equal to or greater than the second threshold value (the speed before the driving is stopped the second threshold value), it is determined whether or not the maximum amount of change in the opening diameter of the stop 32 after the driving of the stop motor 36 is stopped is equal to or greater than the third threshold value (step S45).

Here, the maximum amount of change in the opening diameter is calculated based on the information on the variation width. In a case where the maximum amount of change in the opening diameter is equal to or greater than the third threshold value (the maximum amount of change in the opening amount the third threshold value), the waiting time is set before the exposure is started (step S46).

Meanwhile, in a case where the maximum amount of change in the opening diameter is less than the third threshold value (the maximum amount of change in the opening diameter<the third threshold value), the waiting time is not set. In a case where it is determined that the speed of the stop motor 36 before the driving is stopped is less than the second threshold value (the speed before the driving<the second threshold value) in step S44, the waiting time is not set.

Thereafter, as shown in FIG. 16, it is determined whether or not the shutter button 114 is fully pushed (step S30). In a case where it is determined that the shutter button is not fully pushed, it is determined whether or not the halfway pushing is released (step S31). In a case where the halfway pushing is released, the processing of the exposure control is ended.

Meanwhile, in a case where the shutter button 114 is fully pushed, processing for the exposure is started. First, the stop 32 is driven (step S32). That is, the stop motor 36 is driven under the set driving conditions, and the stop 32 is set to the set target F number.

Thereafter, it is determined whether or not the driving of the stop motor 36 is stopped (step S33). In a case where the driving of the stop motor 36 is stopped, it is determined whether or not the waiting time is set (step S34).

Here, in a case where it is determined that the waiting time is set, the exposure is started after the elapse of the waiting time. In this case, in a case where the driving of the stop motor 36 is stopped, a time elapsed from the stoppage of the driving is measured. It is determined whether or not the waiting time elapses (step S35). In a case where the waiting time elapses, the exposure is performed (step S36). That is, the exposure is performed at the set shutter speed under the set F number.

Meanwhile, in a case where it is determined that the waiting time is not set, the exposure is performed without waiting for the elapse of the waiting time (step S36). That is, the exposure is started immediately after the driving of the stop motor 36 is stopped.

As described above, in accordance with the exposure control device 252 according to the present embodiment, since it is further determined whether or not it is necessary to set the waiting time based on the maximum amount of change in the opening diameter after the driving is stopped, the waiting time can be more appropriately set. That is, in a case where the maximum amount of change in the opening diameter after the driving is stopped is small, since the exposure is started without setting the waiting time, it is possible to prevent the exposure from being unnecessarily delayed. Thus, the exposure can be appropriately started, and the imaging can be performed with an accurate exposure.

Sixth Embodiment in the present embodiment, the speed of the stop motor 36 before the driving is stopped is equal to or greater than the second threshold value, the maximum amount of change in the opening diameter of the stop 32 after the driving of the stop motor 36 is stopped is equal to or greater than the third threshold value, and an exposure time is equal to or less than a fourth threshold value, the waiting time is set. Accordingly, even though the speed of the stop motor 36 before the driving is stopped is the high speed and the maximum amount of change in the opening diameter is large, in a case where the exposure time is long, the waiting time is not set.

In the case where the exposure time is long, the influence of the change in the opening amount after the driving is stopped on the exposure is small. Accordingly, in such a case, the exposure is started immediately after the driving of the stop motor 36 is stopped without setting the waiting time. Accordingly, it is possible to prevent the start of the exposure from being unnecessarily long.

Configuration

The basic configuration of the exposure control device according to the present embodiment is the same as that of the exposure control device described in the fourth embodiment. The exposure start condition setting unit 252C sets the exposure start condition. The exposure start condition setting unit 252C determines whether or not the exposure time is equal to or less than the fourth threshold value based on the information on the shutter speed set by the exposure setting unit 252B. The fourth threshold value is set in consideration of the influence on the exposure.

Actions

Figure 18:
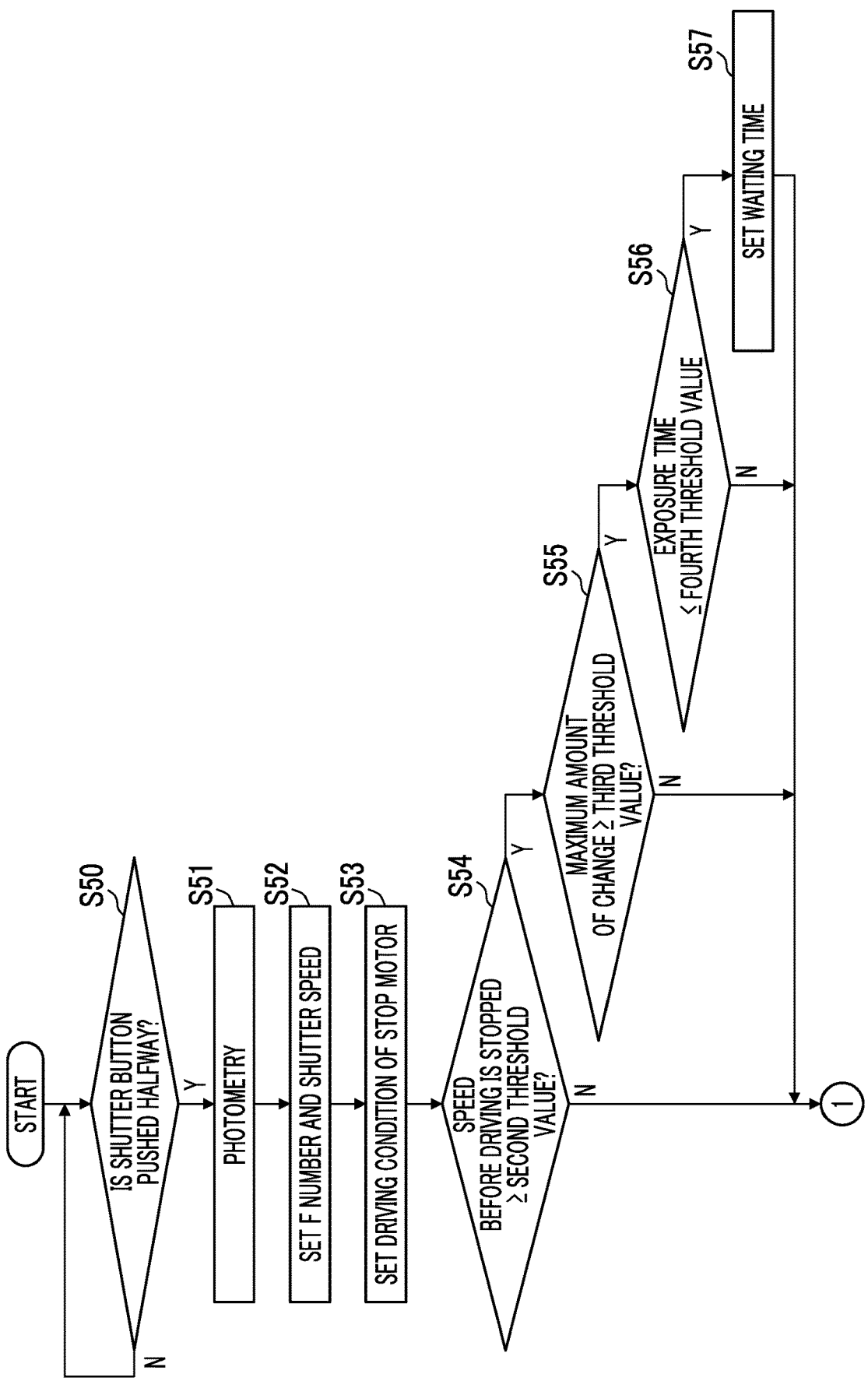
FIG. 18 is a flowchart showing a procedure of the exposure control.

FIGS. 18 and 16 are flowcharts showing a procedure of the exposure control.

As shown in FIG. 18, first, it is determined whether or not the shutter button 114 is pushed halfway (step S50).

In a case where the shutter button 114 is pushed halfway, the photometric processing is performed, and the brightness of the subject is detected (step S51). The F number and the shutter speed are set based on the detected brightness of the subject (step S52). In a case where the exposure mode is manual, the F number and the shutter speed are set to the F number and the shutter set by the user.

In a case where the F number is set, the driving condition of the stop motor 36 is set based on the set F number (step S53). It is determined whether or not the waiting time is set based on the set driving condition of the stop motor. That is, it is determined whether or not the speed of the stop motor 36 before the driving is stopped (the speed before the driving is stopped) is equal to or greater than the second threshold value (step S54). This determination is synonymous with determination of whether or not the speed of the stop motor 36 before the driving is stopped is the high speed.

In a case where the speed of the stop motor 36 before the driving is stopped is equal to or greater than the second threshold value (the speed before the driving is stopped≥the second threshold value), it is determined whether or not the maximum amount of change in the opening diameter of the stop 32 after the driving of the stop motor 36 is stopped is equal to or greater than the third threshold value (step S55).

In a case where the maximum amount of change in the opening diameter is equal to or greater than the third threshold value (the maximum amount of change in the opening amount the third threshold value), it is further determined whether or not the exposure time is equal to or less than the fourth threshold value (step S56). In a case where the exposure time (shutter speed) is equal to or less than the fourth threshold value (the exposure time the fourth threshold value), the waiting time is set before the exposure is started (step S57).

Meanwhile, in a case where the exposure time exceeds the fourth threshold value (the exposure time>the fourth threshold value), the waiting time is not set. In a case where it is determined in step S55 that the maximum amount of change in the opening diameter is less than the third threshold value (the maximum amount of change in the opening diameter<the third threshold value), the waiting time is not set. Similarly, in a case where it is determined in step S44 that the speed of the stop motor 36 before the driving is stopped is less than the second threshold value (the speed before the driving is stopped<the second threshold value), the waiting time is not set.

Thereafter, as shown in FIG. 16, it is determined whether or not the shutter button 114 is fully pushed (step S30). In a case where it is determined that the shutter button is not fully pushed, it is determined whether or not the halfway pushing is released (step S31). In a case where the halfway pushing is released, the processing of the exposure control is ended.

Meanwhile, in a case where the shutter button 114 is fully pushed, processing for the exposure is started. First, the stop 32 is driven (step S32). That is, the stop motor 36 is driven under the set driving conditions, and the stop 32 is set to the set target F number.

Thereafter, it is determined whether or not the driving of the stop motor 36 is stopped (step S33). In a case where the driving of the stop motor 36 is stopped, it is determined whether or not the waiting time is set (step S34).

Here, in a case where it is determined that the waiting rime is set, the exposure is started after the elapse of the waiting time. In this case, in a case where the driving of the stop motor 36 is stopped, a time elapsed from the stoppage of the driving is measured. It is determined whether or not the waiting time elapses (step S35). In a case where the waiting time elapses, the exposure is performed (step S36). That is, the exposure is performed at the set shutter speed under the set F number.

Meanwhile, in a case where it is determined that the waiting time is not set, the exposure is performed without waiting for the elapse of the waiting time (step S36). That is, the exposure is started immediately after the driving of the stop motor 36 is stopped.

As described above, in accordance with the exposure control device 252 according to the present embodiment, since it is further determined whether or not it is necessary to set the waiting time based on the exposure time, the waiting time can be more appropriately set. That is, in a case where the change in the opening diameter has little influence on the exposure, since the exposure is started immediately, it is possible to prevent the start of the exposure from being unnecessarily delayed.

Modification Example

Determination of Whether or Not it is Necessary to Set Waiting Time

Although it has been described in the aforementioned embodiment that the waiting time is set in a case where the speed of the stop motor 36 before the driving is stopped is equal to or greater than the second threshold value, the maximum amount of change in the opening diameter of the stop 32 after the driving of the stop motor 36 is stopped is equal to or greater than the third threshold value, and the exposure time is equal to or less than the fourth threshold value, the waiting time may be set in a case where the speed of the stop motor 36 before the driving is stopped is equal to or greater than the second threshold value and the exposure time is equal to or less than the fourth threshold value. That is, the waiting time may be set based on the speed and the exposure time of the stop motor 36 before the driving is stopped without being in consideration of the maximum amount of change in the opening diameter after the driving is stopped.

Figure 19:
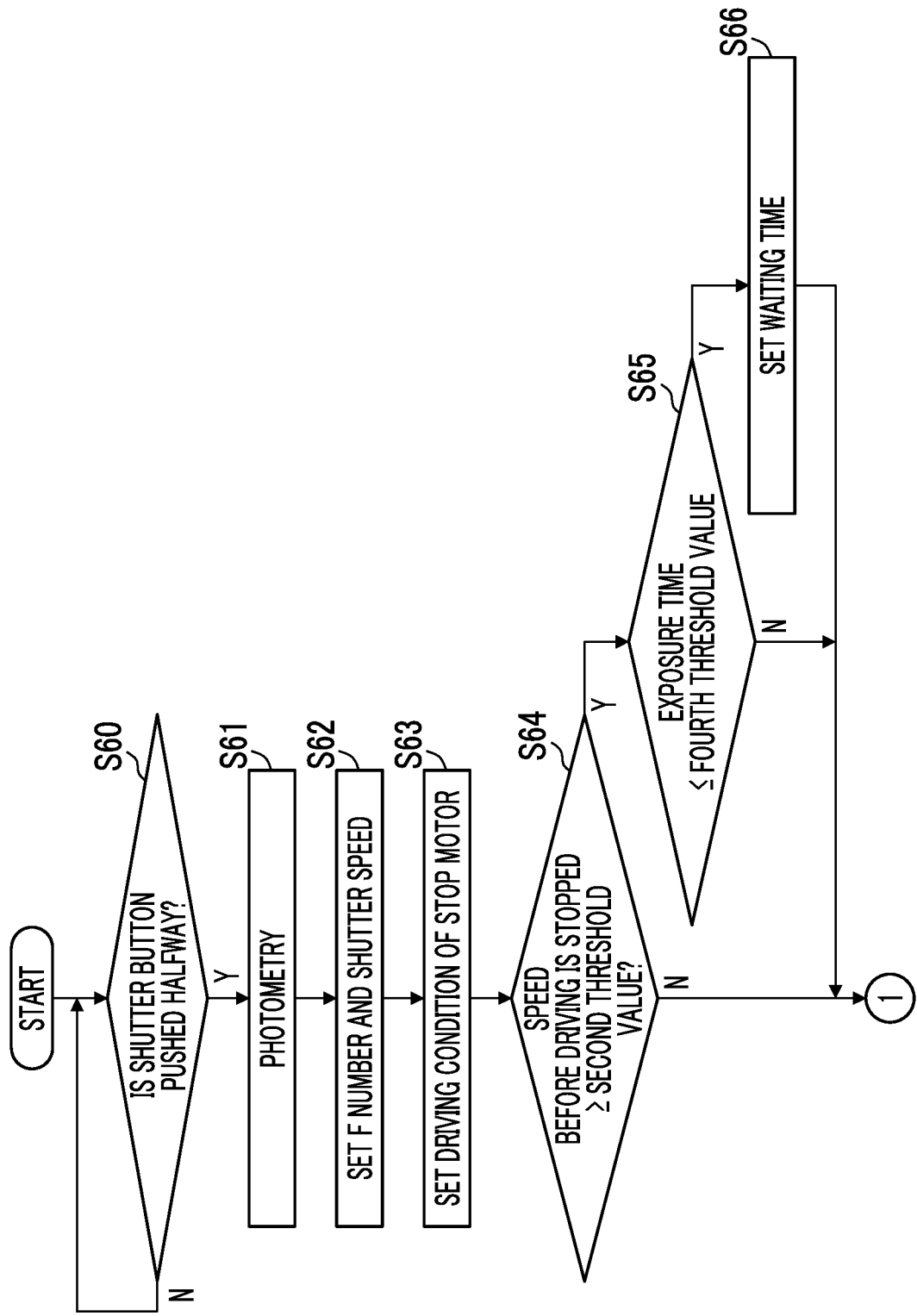
FIG. 19 is a flowchart showing a processing procedure in a case where a waiting time is set based on a speed of the stop motor before the driving is stopped and an exposure time.

FIG. 19 is a flowchart showing a processing procedure in a case where the waiting time is set based on the speed and the exposure time of the stop motor before the driving is stopped.

In this case, first, it is determined whether or not the shutter button 114 is pushed halfway (step S60).

In a case where the shutter button 114 is pushed halfway, the photometric processing is performed, and the brightness of the subject is detected (step S61). The F number and the shutter speed are set based on the detected brightness of the subject (step S62). In a case where the exposure mode is manual, the F number and the shutter speed are set to the F number and the shutter set by the user.

In a case where the F number is set, the driving condition of the stop motor 36 is set based on the set F number (step S63). It is determined whether or not the waiting time is set based on the set driving condition of the stop motor. That is, it is determined whether or not the speed of the stop motor 36 before the driving is stopped (the speed before the driving is stopped) is equal to or greater than the second threshold value (step S64). This determination is synonymous with determination of whether or not the speed of the stop motor 36 before the driving is stopped is the high speed.

In a case Where the speed of the stop motor 36 before the driving is stopped is equal to or greater than the second threshold value (the speed before the driving is stopped≥the second threshold value), it is further determined whether or not the exposure time is equal to or less than the fourth threshold value (step S65). In a case where the exposure time (shutter speed) is equal to or less than the fourth threshold value (the exposure time the fourth threshold value), the waiting time is set before the exposure is started (step S66).

Meanwhile, in a case where the exposure time exceeds the fourth threshold value (the exposure time>the fourth threshold value), the waiting time is not set. Similarly, in a case where it is determined in step S64 that the speed of the stop motor 36 before the driving is stopped is less than the second threshold value (the speed before the driving is stopped<the second threshold value), the waiting time is not set.

As described above, the waiting time may be set based on the speed and the exposure time of the stop motor 36 before the driving is stopped.

Fourth Threshold Value

Figure 20:
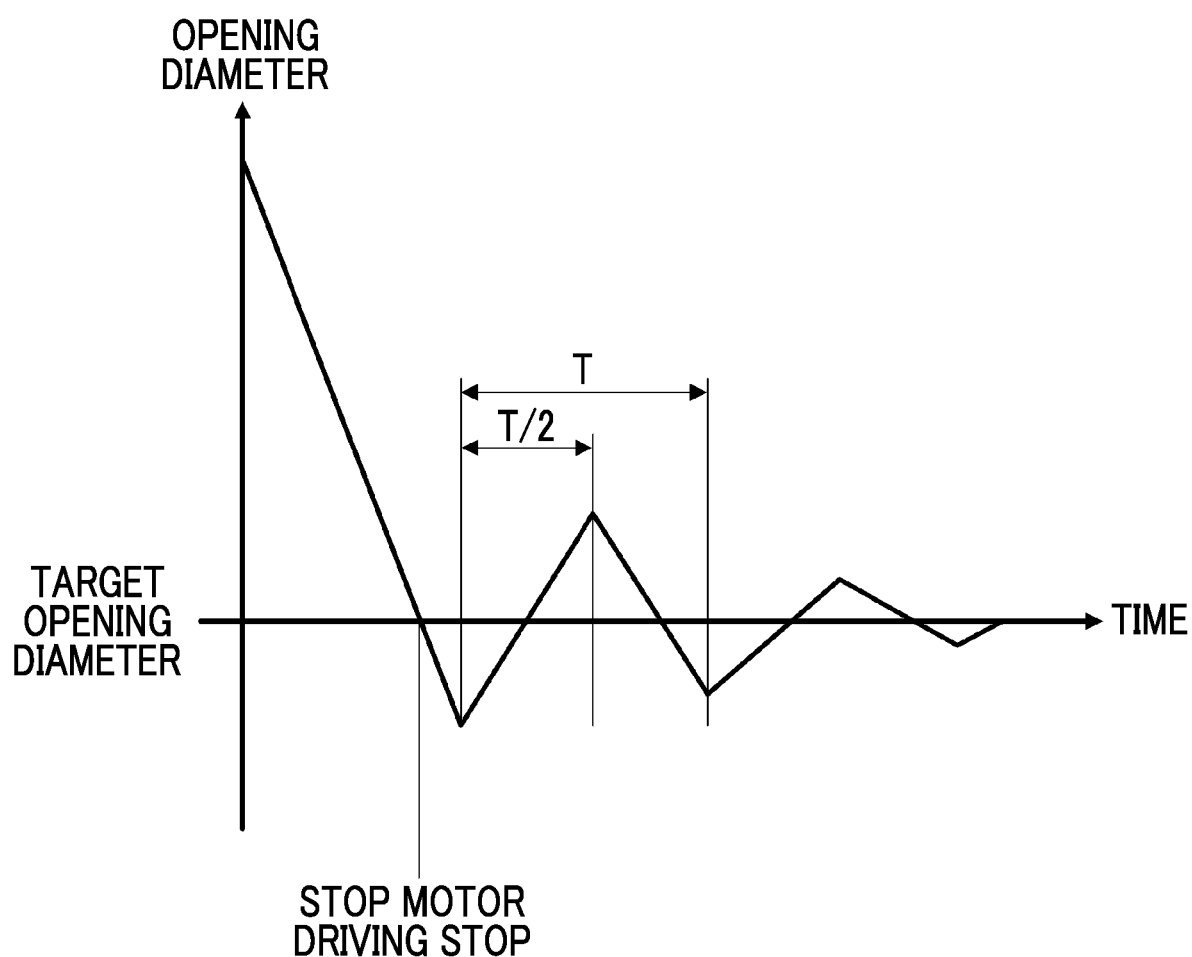
FIG. 20 is a graph showing a transition of the change in the opening diameter after the driving of the stop motor is stopped.

FIG. 20 is a graph showing a transition of a change in the opening diameter after the driving of the stop motor stops. In this graph, a lateral axis indicates time, and a vertical axis indicates the opening diameter of the stop.

As shown in this graph, a period T of the change in the opening diameter of the stop 32 after the driving of the stop motor 36 is stopped is obtained, and a value of the half of the obtained period T can be used as the fourth threshold value. Since the period T is correlated with the variation width, the period T is calculated based on the information on the variation width. That is, the information on the variation width of the opening diameter caused in a case where the opening diameter reaches the target opening diameter by driving the stop motor 36 at a high speed (second speed) is acquired, and the period T is calculated based on the acquired information on the variation width.

As described above, it is possible to more appropriately determine whether or not it is necessary to set the waiting time by setting the half of the period T of the change in the opening diameter to the fourth threshold value.

Other Embodiments

Position at Which Driving Speed of Stop Motor is Activated

Although it has been described in the aforementioned embodiment that the position P at which the driving of the stop motor 36 is switched from the high speed (second speed) to the low speed (first speed) is set to (A−X/2), the position P at which the driving speed of the stop motor is switched is not limited to this position. At least a section after (A−X/2) may be set as the low-speed driving section. Accordingly, the position P may be set at a position before (A−X/2). However, in a case where the position P is set at the position before (A−X/2), since the high-speed driving section is short and it takes a time to set the stop, it is preferable that the position P is set to the position of (A−X/2) or near this position.

Stop

Although it has been described in the aforementioned embodiment that the present invention is applied to the camera using the iris stop, the application of the present invention is not limited thereto. The present invention can be suitably used for the camera using the stop in which there is a difference from the actual opening diameter (F number) is caused depending on the driving speed of the actuator. In other words, the present invention can be suitably used for the camera using the stop of which the variation of the opening diameter is caused depending on the driving speed.

Although it has been described in the aforementioned embodiment that the stepping motor is used as the actuator for driving the stop, the actuator for driving the stop is not limited thereto. Due to the use of the stepping motor, open-loop control can be performed, and the configuration and control of the device can be simplified.

Driving Speed of Stop Motor

The driving speed of the stop motor 36 may be switched at least in two stages, and the second speed may be set to a speed faster than the first speed (first speed<second speed).

The first speed and the second speed may be variable by setting by the user or an imaging mode. In this case, the stop control device comprises a driving speed setting unit that sets the first speed and the second speed.

In a case where the user sets the first speed and the second speed, for example, the first speed and the second speed are set by using the camera operation unit 110 provided in the camera main body 100. The stop control device 44 acquires the set information from the camera main body 100, and sets the first speed and the second speed.

In a case where the first speed and the second speed are set according to the imaging mode, the first speed and the second speed are set by, for example, the camera microcomputer 250. The stop control device 44 acquires the set information from the camera main body 100, and sets the first speed and the second speed.

Configuration of Camera

Although it has been described in the aforementioned embodiment that the present invention is applied to the interchangeable lens camera, the application of the present invention is not limited thereto. The present invention is also applicable to a lens-integrated camera in which the lens is integrally attached to the camera main body.

Although it has been described in the aforementioned embodiment that the stop control device 44 is provided in the interchangeable lens 10, the stop control device may be provided in the camera main body 100. In this case, for example, the camera microcomputer 250 provided in the camera main body 100 can function as the stop control device by executing a predetermined program (stop control program).

Although it has been described in the aforementioned embodiment that the present invention is applied to the camera, the application of the present invention is not limited thereto. The present invention is also applicable to a so-called film-based camera. The present invention can be applied to a video camera, a television camera, and a cinema camera, and can be similarly applied to electronic devices (for example, a mobile phone, a smartphone, a tablet personal computer, and a laptop personal computer) having an imaging function.

Stop Control Device and Exposure Control Device

Although it has been described in the aforementioned embodiment that the stop control device and the exposure control device according to the present invention are combined, the stop control device and the exposure control device can be used alone.

In a case where the exposure control device is used alone, the second threshold value, the third threshold value, and the fourth threshold value described in each embodiment can be read as a fifth threshold value, a sixth threshold value, and a seventh threshold value.

For example, in a case where it is determined whether or not it is necessary to set the waiting time based on the speed of the stop motor 36 before the driving is stopped, it is determined whether or not it is necessary to set the waiting time based on whether or not the speed of the stop motor 36 before the driving is stopped is equal to or greater than the fifth threshold value.

In a case where it is determined whether or not it is necessary to set the waiting time based on the speed of the stop motor 36 before driving is stopped and the maximum amount of change in the opening diameter of the stop after the driving of the stop motor 36 is stopped, it is determined whether or not it is necessary to set the waiting time based on whether or not the speed of the stop motor 36 before the driving is stopped is equal to or greater than the fifth threshold value and whether or not the maximum amount of change in the opening diameter of the stop 32 after the driving of the stop motor 36 is stopped is equal to or greater than the sixth threshold value.

In a case where it is determined whether or not it is necessary to set the waiting time based on the speed of the stop motor 36 before the driving is stopped and the exposure time, it is determined whether or not the speed of the stop motor 36 before the driving is stopped is equal to or greater than the fifth threshold value and whether or not it is necessary to set the waiting time based on whether or not the exposure time is equal to or less than the seventh threshold value.

In a case where it is determined whether or not it is necessary to set the waiting time based on the speed of the stop motor 36 before the driving is stopped, the maximum amount of change in the opening diameter of the stop 32 after the driving of the stop motor 36 is stopped, and the exposure time, it is determined whether or not it is necessary to set the waiting time based on whether or not the speed of the stop motor 36 before the driving is stopped is equal to or greater than the fifth threshold value, whether or not the maximum amount of change in the opening diameter of the stop 32 after the driving of the stop motor 36 is stopped is equal to or greater than the sixth threshold value, and whether or not the exposure time is equal to or less than the seventh threshold value.

Others

Although it has been described in the aforementioned embodiments that the functions of the stop control device and the exposure control device are realized by the microcomputer, the hardware configuration for realizing these functions is not limited thereto. These functions can be realized by various processors. A CPU which is a general-purpose processor functioning as a processing unit that performs various processing by executing software (program) and a dedicated electric circuit which is a processor having a circuit configuration designed as a dedicated circuit in order to perform specific processing such as programmable logic device (PLD) and application specific integrated circuit (ASIC) of which a circuit configuration can be changed after field-programmable gate array (FPGA) is manufactured are included in the various processors. The medium in which the predetermined programs (stop control program and exposure control program) are stored may be a non-transitory computer readable recording medium such as a hard disk, a compact disk (CD), a digital versatile disk (DVD), and various semiconductor memories.

One processing unit may be constituted by one of these various processors, or may be constituted by two or more processors of the same type or different types. For example, one processing unit may be constituted by a plurality of FPGAs or a combination of a CPU and FPGA.

A plurality of processing units may be constituted by a single processor. As an example in which the plurality of processing units is constituted by one processor, there is a first example in which one processor is constituted by a combination of one or more CPUs and software or one processor functions as the plurality of processing units as represented by a computer such as a client or server. There is a second example in which as represented by system on chip (SoC), a processor that realizes the functions of the entire system including the plurality of processing units by a single integrated circuit (IC) chip is used. As described above, the various processing units are constituted by using one or more of the various processors as a hardware structure.

The hardware structures of these various processors are more specifically electric circuits in which circuit elements such as semiconductor elements are combined.

EXPLANATION OF REFERENCES

1: camera
10: interchangeable
12: lens barrel
14: lens operation unit
16: focus ring
18: stop ring
20: focus adjustment mechanism
22: focus lens group
26: focus motor
28: motor drive circuit
30: light amount adjustment mechanism
32: stop
32a: stop leaf blade
32b: opening portion
36: stop motor
38: motor drive circuit
40: lens microcomputer
42: focus control device
44: stop control device
44A: stop motor driving condition setting unit
44B: stop motor driving controller
44C: stop control information storage unit
44D: stop operation speed setting unit
100: camera main body
102: main-body-side mount
104: main monitor
104a: LCD drive circuit
106: sub monitor
106a: LCD drive circuit
108: electronic viewfinder
108a: LCD drive circuit
110: camera operation unit
111: sensitivity dial
112: delete button
113: power lever
114: shutter button
115: drive button
116: sub monitor illumination button
117: shutter speed dial
118: playback button
119: front command dial
120: rear command dial
121: focus lever
122: quick menu button
123: menu/OK button
124: selector button
125: display/BACK button
126: first function button
127: second function button
128: third function button
129: fourth function button
130: fifth function button
140: timepiece unit
150: image sensor
152: image sensor drive circuit
154: shutter
156: shutter drive circuit
220: analog signal processing unit
277: analog-to-digital converter (ADC)
224: digital signal processing unit
226: phase difference AF processing unit
228: memory card interface
230: memory card
250: camera microcomputer
252: exposure control device
252A: photometry unit
252B: exposure setting unit
252C: exposure start condition setting unit
252D: exposure controller
254: AF control device
256: recording control device
258: main monitor display control device
260: sub monitor display control device
262: EVF display control device
L: optical axis
T: period of change in opening diameter of stop S1 to S5: procedure for setting driving condition of stop motor
S10 to S17: procedure for setting driving condition of stop motor
S20 to S25: procedure of exposure control
S30 to S36: procedure of exposure control
S40 to S46: procedure of exposure control
S50 to S57: procedure of exposure control
S60 to S66: procedure of exposure control

What is claimed is:

1. A stop control device comprising:
at least one processor configured to switch a driving speed of an actuator for a stop in two stages, set a driving condition of the actuator for causing the stop to have a target opening diameter, and drive the actuator under the set driving condition; and
a stop control information recording medium configured to store information on a driving stop position A of the actuator for a stop at which an opening diameter reaches the target opening diameter in a case where the actuator is driven at a first speed and information on a variation width X of the opening diameter caused in a case where the opening diameter reaches the target opening diameter by driving the actuator at a second speed faster than the first speed, wherein, the at least one processor sets the driving speed of the actuator to switch in the two stages by performing setting such that the driving stop position of the actuator is set to A, the actuator is driven at the second speed in a section before a position of (A−X/2), the driving speed is switched from the second speed to the first speed at the position of (A−X/2), and the actuator is driven at the first speed in a section after (A−X/2).

2. The stop control device according to claim 1, wherein
the at least one processor determines whether or not the variation width of the opening diameter caused in a case where the actuator is driven at the second speed is within an allowable range, and
in a case where the variation width is within the allowable range, the at least one processor performs setting such that the actuator is driven at the second speed, and
in a case where the variation width exceeds the allowable range, the at least one processor sets the driving speed of the actuator to switch in the two stages by performing setting such that the driving stop position of the actuator is set to A, the actuator is driven at the second speed in the section before the position of (A−X/2), the driving speed is switched from the second speed to the first speed at the position of (A−X/2), and the actuator is driven at the first speed in the section after (A−X/2).

3. The stop control device according to claim 2, wherein
the at least one processor sets an operation speed of the stop, and
in a case where the operation speed of the stop set by the at least one processor is a low speed, the at least one processor performs setting such that the actuator is driven at the first speed, and
in a case where the operation speed of the stop set by the at least one processor is a high speed, the at least one processor determines whether or not the variation width of the opening diameter caused in a case where the actuator is driven at the second speed is within an allowable range, and
in a case where the variation width is within the allowable range, the at east one processor performs setting such that the actuator is driven at the second speed, and
in a case where the variation width exceeds the allowable range, the at least one processor sets the driving speed of the actuator to switch in the two stages by performing setting such that the driving stop position of the actuator is set to A, the actuator is driven at the second speed in the section before the position of (A−X/2), the driving speed is switched from the second speed to the first speed at the position of (A−X/2), and the actuator is driven at the first speed in the section after (A−X/2).

4. The stop control device according to claim 3,
wherein, in a case where an amount of change in the opening diameter is equal to or less than a first threshold value, the at least one processor performs setting such that the stop is operated at the low speed.

5. The stop control device according to claim 1, wherein the at least one processor sets the first speed and the second speed.

6. The stop control device according to claim 1, wherein the stop control information recording medium stores, for each opening diameter settable with the stop, the information on the driving stop position A of the actuator at which the opening diameter reaches the target opening diameter in a case where the actuator is driven at a first speed and the information on the variation width X of the opening diameter caused in a case where the opening diameter reaches the target opening diameter by driving the actuator at the second speed faster than the first speed.

7. The stop control device according to claim 1, wherein the stop control information recording medium stores, for each opening diameter settable with the stop,
information on the driving stop position A of the actuator at which the opening diameter reaches the target opening diameter in a case where the actuator is driven at the first speed in a direction to open the stop and information on the driving stop position A of the actuator at which the opening diameter reaches the target opening diameter in a case where the actuator is driven at the first speed in a direction to close the stop, and information on the variation width X of the opening diameter caused in a case where the opening diameter reaches the target opening diameter by driving the actuator at the second speed faster than the first speed in the direction to open the stop and information on the variation width X of the opening diameter caused in a case where the opening diameter reaches the target opening diameter by driving the actuator at the second speed in the direction to close the stop.

8. An interchangeable lens comprising the stop control device according to claim 1.

9. A camera main body comprising the interchangeable lens according to claim 8 attached thereto.

10. The camera main body according to claim 9, wherein the at least one processor sets an exposure start condition and starts an exposure under the set start condition after driving of the actuator is stopped, and
in a case where a speed of the actuator before the driving of the actuator is stopped is equal to or greater than a second threshold value, the at least one processor sets a waiting time between stoppage of the driving of the actuator and start of the exposure.

11. The camera main body according to claim 10,
wherein, in a case where the speed of the actuator before the driving of the actuator is stopped is equal to or greater than the second threshold value and a maximum amount of change in the opening diameter of the stop after the driving of the actuator is stopped is equal to or greater than a third threshold value, the at least one processor sets the waiting time between the stoppage of the driving of the actuator and the start of the exposure.

12. The camera main body according to claim 10,
wherein, in a case where the speed of the actuator before the driving of the actuator is stopped is equal to or greater than the second threshold value and an exposure time is equal to or less than a fourth threshold value, the at least one processor sets the waiting time between the stoppage of the driving of the actuator and the start of the exposure.

13. The camera main body according to claim 12,
wherein a half of a period of the change in the opening diameter of the stop after the driving of the actuator is stopped is used as the fourth threshold value.

14. The camera main body according to claim 10,
wherein, in a case where the speed of the actuator before the driving of the actuator is stopped is equal to or greater than the second threshold value, a maximum amount of change in the opening diameter of the stop after the driving of the actuator is stopped is equal to or greater than a third threshold value, and an exposure time is equal to or less than a fourth threshold value, the at least one processor sets the waiting time between the stoppage of the driving of the actuator and the start of the exposure.

15. The camera main body according to claim 10,
wherein a time from when the driving of the actuator is stopped to when the change in the opening diameter of the stop is converged to a predetermined value or less is used as the waiting time.

16. A camera comprising the stop control device according to claim 1.

17. The camera according to claim 16, wherein
the at least one processor sets an exposure start condition and starts an exposure under the set start condition after driving of the actuator is stopped, and
in a case where a speed of the actuator before the driving of the actuator is stopped is equal to or greater than a second threshold value, the at least one processor sets a waiting time between stoppage of the driving of the actuator and start of the exposure.

18. The camera according to claim 17,
wherein, in a case where the speed of the actuator before the driving of the actuator is stopped is equal to or greater than the second threshold value and a maximum amount of change in the opening diameter of the stop after the driving of the actuator is stopped is equal to or greater than a third threshold value, the at least one processor sets the waiting time between the stoppage of the driving of the actuator and the start of the exposure.

19. The camera according to claim 17,
wherein, in a case where the speed of the actuator before the driving of the actuator is stopped is equal to or greater than the second threshold value and an exposure time is equal to or less than a fourth threshold value, the at least one processor sets the waiting time between the stoppage of the driving of the actuator and the start of the exposure.

20. The camera according to claim 19,
wherein a half of a period of the change in the opening diameter of the stop after the driving of the actuator is stopped is used as the fourth threshold value.

21. The camera according to claim 17,
wherein, in a case where the speed of the actuator before the driving of the actuator is stopped is equal to or greater than the second threshold value, a maximum amount of change in the opening diameter of the stop after the driving of the actuator is stopped is equal to or greater than a third threshold value, and an exposure time is equal to or less than a fourth threshold value, the at least one processor sets the waiting time between the stoppage of the driving of the actuator and the start of the exposure.

22. The camera according to claim 17,
wherein a time from when the driving of the actuator is stopped to when the change in the opening diameter of the stop is converged to a predetermined value or less is used as the waiting time.

23. A stop control method comprising:
setting a target opening diameter of a stop;
setting to switch a driving speed of an actuator for the stop in two stages and sets a driving condition of the actuator for causing the stop to have the target opening diameter, in which assuming that a driving stop position of the actuator at which an opening diameter reaches the target opening diameter in a case where the actuator is driven at a first speed is A and a variation width of the opening diameter caused in a case where the opening diameter reaches the target opening diameter by driving the actuator at a second speed faster than the first speed is X, wherein the driving speed of the actuator is set to switch in the two stages by performing setting such that the driving stop position of the actuator is set to A, the actuator is driven at the second speed in a section before a position of (A−X/2), the driving speed is switched from the second speed to the first speed at the position of (A−X/2), and the actuator is driven at the first speed in a section after (A−X/2); and
operating the stop by driving the actuator under the set driving condition.

24. A non-transitory computer-readable recording medium causing a computer to realize:
in a case where a command stored in the recording medium is read by the computer,
a stop control function including
a function of setting a target opening diameter of a stop;
a function of setting to switch a driving speed of an actuator for the stop in two stages and sets a driving condition of the actuator for causing the stop to have the target opening diameter, in which assuming that a driving stop position of the actuator at which an opening diameter reaches the target opening diameter in a case where the actuator is driven at a first speed is A and a variation width of the opening diameter caused in a case where the opening diameter reaches the target opening diameter by driving the actuator at a second speed faster than the first speed is X, wherein the driving speed of the actuator is set to switch in the two stages by performing setting such that the driving stop position of the actuator is set to A, the actuator is driven at the second speed in a section before a position of (A−X/2), the driving speed is switched from the second speed to the first speed at the position of (A−X/2), and the actuator is driven at the first speed in a section after (A−X/2); and a function of operating the stop by driving the actuator under the set driving condition.

\* \* \* \* \*